(12) United States Patent
Choi

(10) Patent No.: US 9,274,681 B2
(45) Date of Patent: Mar. 1, 2016

(54) TERMINAL AND METHOD OF CONTROLLING THE SAME

(75) Inventor: Kyung Dong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 836 days.

(21) Appl. No.: 12/268,362

(22) Filed: Nov. 10, 2008

(65) Prior Publication Data

US 2009/0244019 A1 Oct. 1, 2009

(30) Foreign Application Priority Data

Mar. 26, 2008 (KR) .................. 10-2008-0027976
Mar. 26, 2008 (KR) .................. 10-2008-0028003

(51) Int. Cl.
*G06F 3/041* (2006.01)
*G06F 3/0482* (2013.01)
*G06F 3/0483* (2013.01)
*G06F 3/0488* (2013.01)

(52) U.S. Cl.
CPC ............ *G06F 3/0482* (2013.01); *G06F 3/0483* (2013.01); *G06F 3/04883* (2013.01); *G06F 2203/04802* (2013.01)

(58) Field of Classification Search
USPC .......................................................... 345/173
See application file for complete search history.

(56) References Cited

U.S. PATENT DOCUMENTS

| | | | |
|---|---|---|---|
| 6,680,677 B1 * | 1/2004 | Tiphane | 341/22 |
| 6,947,017 B1 | 9/2005 | Gettemy | |
| 2002/0015064 A1 | 2/2002 | Robotham et al. | |
| 2003/0174125 A1 * | 9/2003 | Torunoglu et al. | 345/168 |
| 2005/0024322 A1 * | 2/2005 | Kupka | 345/156 |
| 2006/0161870 A1 * | 7/2006 | Hotelling et al. | 715/863 |
| 2006/0161871 A1 * | 7/2006 | Hotelling et al. | 715/863 |
| 2006/0267966 A1 * | 11/2006 | Grossman et al. | 345/179 |
| 2007/0061806 A1 * | 3/2007 | Jeong | 718/100 |
| 2007/0186758 A1 * | 8/2007 | Kim et al. | 84/622 |
| 2008/0001924 A1 | 1/2008 | de los Reyes et al. | |
| 2008/0062141 A1 | 3/2008 | Chandhri | |
| 2008/0174321 A1 * | 7/2008 | Kang et al. | 324/686 |
| 2008/0266255 A1 * | 10/2008 | Lawson et al. | 345/163 |

FOREIGN PATENT DOCUMENTS

| | | |
|---|---|---|
| AU | 2007101053 | 12/2007 |
| CN | 101040244 | 9/2007 |
| CN | 101052182 | 10/2007 |
| CN | 101089804 | 12/2007 |
| CN | 101097496 | 1/2008 |
| JP | 2003-195998 | 7/2003 |
| KR | 10-2007-0036077 | 4/2007 |

(Continued)

OTHER PUBLICATIONS

Russian Federation Federal Service for Intellectual Property, Patents and Trademarks Application Serial No. 2008148670/08, Decision of Grant dated Jul. 29, 2013, 9 pages.

*Primary Examiner* — Seokyun Moon
(74) *Attorney, Agent, or Firm* — Lee, Hong, Degerman, Kang & Waimey

(57) ABSTRACT

A mobile terminal and method of controlling the same are disclosed. The mobile terminal includes a touchscreen and a control unit for receiving a first command according to a state of an object in near-proximity to the touchscreen, and receiving a second command according to a state of the object contacting the touchscreen.

6 Claims, 35 Drawing Sheets

(56) References Cited

FOREIGN PATENT DOCUMENTS

| KR | 10-2007-0037773 | 4/2007 |
| KR | 10-2007-0045062 | 5/2007 |
| KR | 10-2007-0113016 | 11/2007 |
| KR | 10-2008-0007991 | 1/2008 |
| RU | 2201618 | 3/2003 |
| RU | 2288512 | 11/2006 |
| WO | WO 2007024035 A1 * | 3/2007 |

* cited by examiner

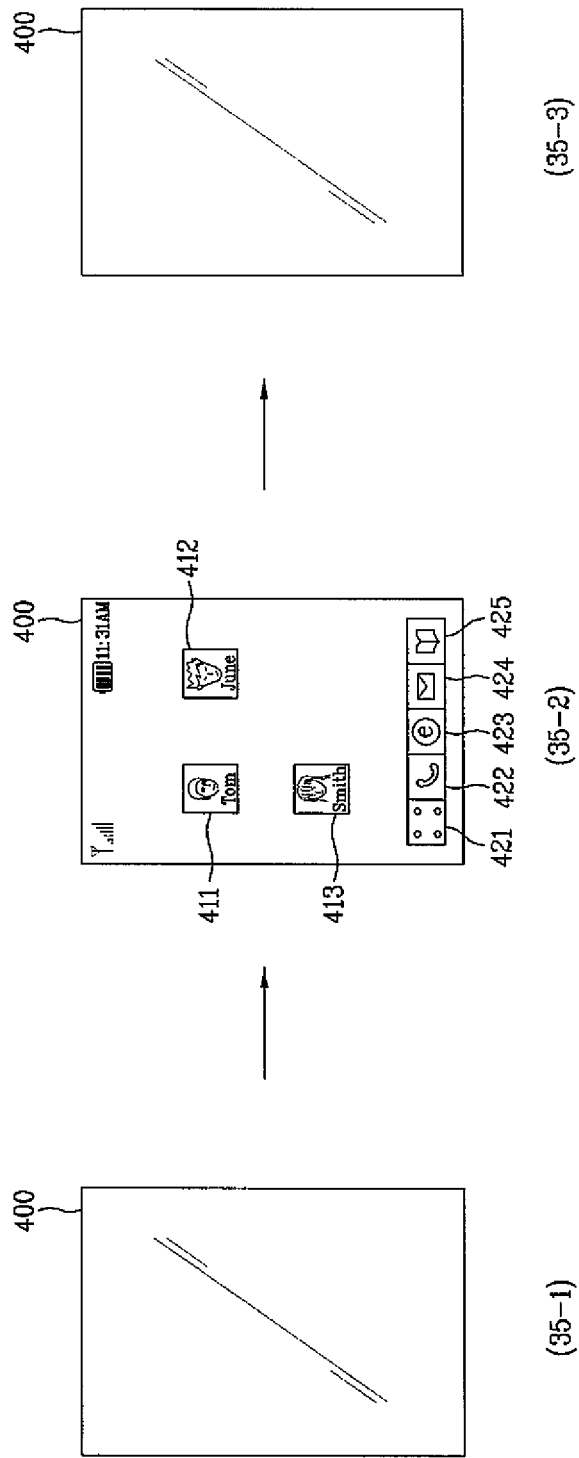

TERMINAL AND METHOD OF CONTROLLING THE SAME

CROSS-REFERENCE TO RELATED APPLICATIONS

Pursuant to 35 U.S.C. §119, this application claims the benefit of earlier filing date and right of priority to Korean Application No. 10-2008-0027976, filed on Mar. 26, 2008 and Korean Application No. 10-2008-0028003, filed on Mar. 26, 2008, the contents of which are hereby incorporated by reference herein in their entirety.

FIELD OF THE INVENTION

The present invention relates to a terminal, and more particularly, to a terminal and method of controlling the same. Although the present invention is suitable for a wide scope of applications, it is particularly suitable for enabling various functions within the terminal to be implemented by further considering a user's convenience.

BACKGROUND OF THE INVENTION

A mobile terminal is a device which may be configured to perform various functions. Examples of such functions include data and voice communication, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

There are ongoing efforts to support and increase the functionality of mobile terminals. Such efforts include software and hardware improvements, as well as changes and improvements in the structural components which form the mobile terminal.

When the terminal operates as a multimedia device capable of performing the above-mentioned complicated functions, various menus corresponding to the complicated functions exist within the terminal. However, the various menus often cause confusion to a user manipulating the terminal. Therefore, a demand has risen for additional terminal functions and capabilities which aid a user in manipulating the various menus.

SUMMARY OF THE INVENTION

Accordingly, the present invention is directed to a terminal and method of controlling the same that substantially obviate one or more problems due to limitations and disadvantages of the related art.

An object of the present invention is to provide a terminal and method of controlling the same, by which a terminal user is facilitated to select a specific menu from various menus existing in the terminal and then enabled to input a prescribed command within the selected menu.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal comprising a touchscreen, and a control unit for receiving a first command according to a state of an object in near-proximity to the touchscreen, and receiving a second command according to a state of the object contacting the touchscreen.

In one aspect of the invention, if one of the first command and second command is received, the control unit switches a menu currently executed in the mobile terminal. Moreover, if the other of the first command and second command is received, the control unit receives a command relative to the menu currently executed in the mobile terminal. Preferably, the control unit receives a menu switching command when the object is in near-proximity to the touchscreen and moved along the touchscreen while in near-proximity to the touchscreen. Preferably, the first command is related to a first group of menus and the second command is related to a second group of menus in the mobile terminal.

In another aspect of the invention, the control unit simultaneously executes at least two menus on the touchscreen, and wherein the control unit receives the first command for one of the at least two menus and receives the second command for the other of the at least two menus. Preferably, the control unit displays images corresponding to each menu overlapping each other on the touchscreen, and wherein the first command is related to the menu having an image overlapped on the touchscreen and the second command is related to the menu having an image visible on the touchscreen. Alternatively, the control unit displays images corresponding to each menu overlapping each other on the touchscreen, and wherein the second command is related to the menu having an image overlapped on the touchscreen and the first command is related to the menu having an image visible on the touchscreen.

In accordance with another embodiment of the present invention, a mobile terminal comprises a touchscreen, and a control unit for determining whether to receive a command according to a state of an object in near-proximity to the touchscreen, or according to a state of the object contacting the touchscreen.

Preferably, the control unit displays an icon on the touchscreen for switching between receiving a command according a state of an object in near-proximity to the touchscreen and receiving a command according to a state of the object contacting the touchscreen. Moreover, the mobile terminal may further comprises a switch for enabling the control unit to receive a command according to at least one of a state of the object in near-proximity to the touchscreen and a state of the object contacting the touchscreen.

In accordance with another embodiment of the present invention, a method for controlling a mobile terminal having a touchscreen comprises controlling the mobile terminal according to at least one of a first command and second command, receiving the first command when a state of an object is in near-proximity to the touchscreen, and receiving the second command when a state of the object contacts the touchscreen.

In one aspect of the invention, the method further comprises switching a menu currently executed in the mobile terminal if one of the first command and second command is received. Moreover, the method comprises receiving a command relative to the menu currently executed in the mobile terminal if the other of the first command and second command is received. Furthermore, the method comprises receiving a menu switching command when the object is in near-proximity to the touchscreen and moved along the touchscreen while in near-proximity to the touchscreen. Preferably, the first command is related to a first group of menus and the second command is related to a second group of menus in the mobile terminal.

In a further aspect of the invention, the method comprises simultaneously executing at least two menus on the touchscreen, receiving the first command for one of the at least two menus, and receiving the second command for the other of the at least two menus.

Preferably, the method comprises displaying images corresponding to each menu overlapping each other on the touchscreen, wherein the first command is related to the menu having an image overlapped on the touchscreen and the second command is related to the menu having an image visible on the touchscreen. Alternatively, the method comprises displaying images corresponding to each menu overlapping each other on the touchscreen, wherein the second command is related to the menu having an image overlapped on the touchscreen and the first command is related to the menu having an image visible on the touchscreen.

In accordance with another embodiment of the present invention, a method for controlling a mobile terminal comprises determining whether to receive a command according to a state of an object in near-proximity to the touchscreen, or according to a state of the object contacting the touchscreen.

Preferably, the method comprises displaying an icon on the touchscreen for switching between receiving a command according a state of an object in near-proximity to the touchscreen and receiving a command according to a state of the object contacting the touchscreen. Moreover, the method comprises providing a switch on the mobile terminal for enabling the mobile terminal to receive a command according to at least one of a state of the object in near-proximity to the touchscreen and a state of the object contacting the touchscreen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 35 is a state diagram of a display screen on which a method of controlling a mobile terminal according to a fourteenth embodiment of the present invention is implemented.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. It is to be understood by those of ordinary skill in this technological field that other embodiments may be utilized, and structural, electrical, as well as procedural changes may be made without departing from the scope of the present invention.

As used herein, the suffixes 'module', 'unit' and 'part' are used for elements in order to facilitate the disclosure only. Thus, significant meanings or roles are not given to the suffixes themselves and it is understood that the 'module', 'unit' and 'part' can be used together or interchangeably.

Figure 1:
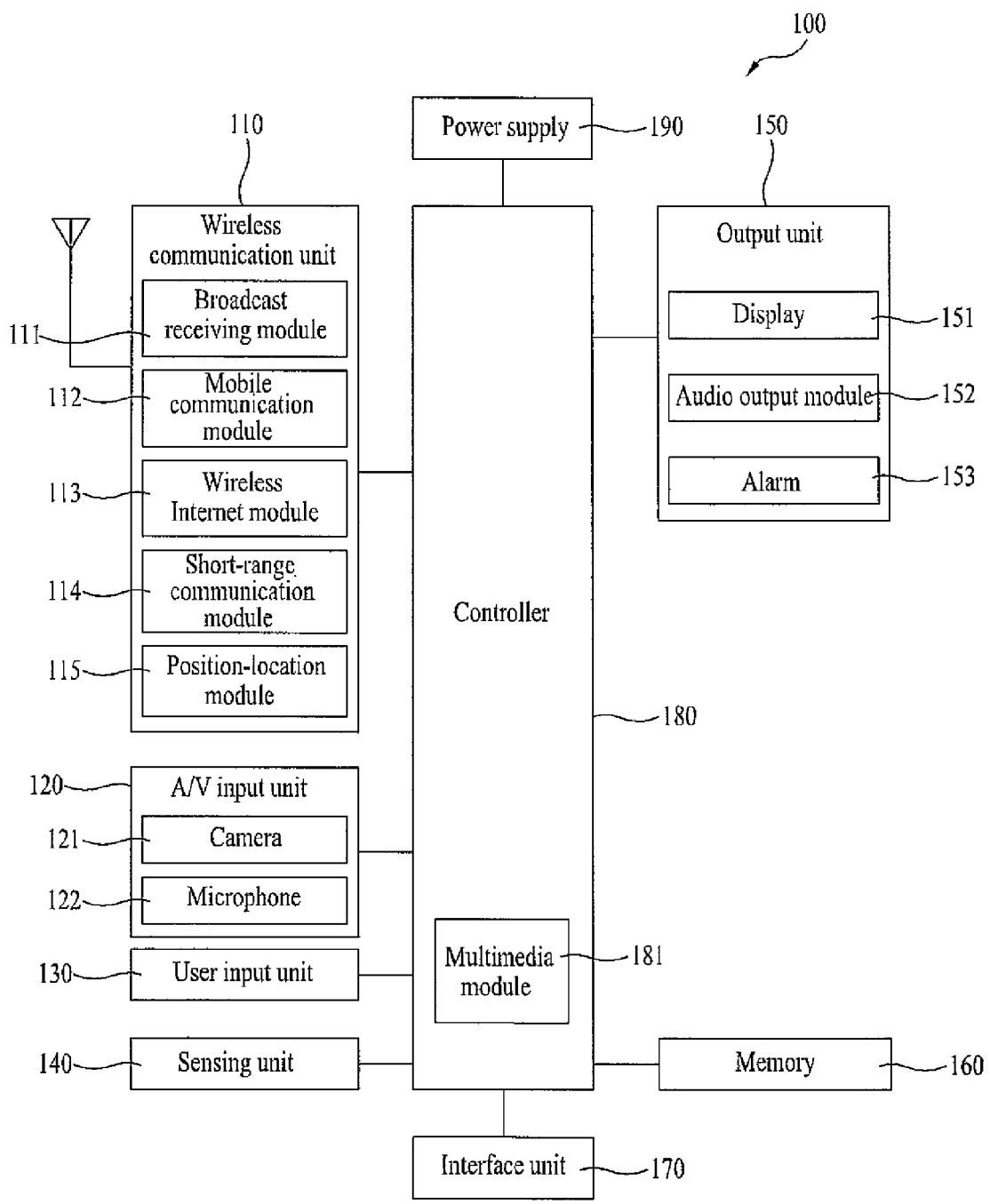
FIG. 1 is a block diagram of a mobile terminal in accordance with an embodiment of the present invention.

FIG. 1 is a block diagram of a mobile terminal 100 in accordance with an embodiment of the present invention. The mobile terminal 100 may be implemented using a variety of different types of terminals. Examples of such terminals include mobile as well as non-mobile terminals, such as mobile phones, user equipment, smart phones, computers, digital broadcast terminals, personal digital assistants, portable multimedia players (PMP) and navigators.

By way of non-limiting example only, further description will be with regard to a mobile terminal 100. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wired communication unit. The wireless communication unit 110 and wired communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

Examples of broadcast associated information include information associated with a broadcast channel, a broadcast program, a broadcast service provider, etc. For example, the broadcast associated information may include an electronic program guide (EPG) of a digital multimedia broadcast (DMB) and an electronic service guide (ESG) of a digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless Internet module 113 supports Internet access for the mobile terminal 100. This module may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless Internet module can be replaced with a wired Internet module in non-mobile terminals. The wireless Internet module 113 and wired Internet module may be commonly referred to as an Internet module.

A short-range communication module 114 facilitates relatively short-range communications. Suitable technologies for short-range communication may include, but are not limited to, radio frequency identification (RFID), infrared data association (IrDA), ultra-wideband (UWB), as well as the networking technologies commonly referred to as Bluetooth and ZigBee.

A position-location module 115 identifies or otherwise obtains the location of the mobile terminal 100. This module may be implemented using global positioning system (GPS) components which cooperate with associated satellites, network components, and combinations thereof.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as a phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad utilizing static pressure/capacitance, a jog wheel and a jog switch. A specific example is one in which the user input unit 130 is configured as a touchpad in cooperation with a touchscreen display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 110 is connected to an external cradle, the interface unit 170 becomes a passage for supplying the mobile terminal 100 with power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

The touchscreen can be configured to detect a touch input pressure as well as a touch input position and size.

Meanwhile, a proximity sensor (not shown in the drawing) can be provided within or around the touchscreen. The proximity sensor detects an object approaching a prescribed detecting surface or a presence or non-presence of an object existing around itself using an electromagnetic power or infrared rays without mechanical contact. Hence, the proximity sensor is superior to a contact sensor in lifespan and utilization.

An example of an operation of the proximity sensor is explained as follows. First, if an object approaches a sensor detecting surface while an oscillation circuit oscillates a sinusoidal radio frequency, an oscillation amplitude of the oscillation circuit attenuates or stops. This change is converted to an electric signal to detect a presence or non-presence of the object. Therefore, even if a material were to come between the RF oscillation proximity sensor and the object, a proximity switch would be able to detect the object without interference from the material. Alternatively, even if the proximity sensor was not provided, if the touchscreen is electrostatic, it can be configured to detect the proximity of a pointer through an electric field change attributed to the proximity of the pointer.

Accordingly, if the pointer is placed in the vicinity of, or near-proximity to, the touchscreen without actually contacting the touchscreen, the touchscreen is able to detect a position of the pointer and a distance between the pointer and the touchscreen. For clarity and convenience of explanation, an action for enabling the pointer to approach, or be in near-proximity to, the touchscreen and be recognized as placed on the touchscreen is referred to as a 'proximity touch'. An action of enabling the pointer to actually come into contact with the touchscreen is referred to as a 'contact touch'. Preferably, a position, at which the proximity touch is made to the touchscreen using the pointer, relates to a position of the pointer vertically corresponding to the touchscreen when the pointer makes the proximity touch.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as a call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is a tactile sensation. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

Moreover, data for various patterns of vibration and/or sound outputted in case of a touch input to the touchscreen can be stored in the memory 160.

The memory 160 shown in FIG. 1 may be implemented using any type or combination of suitable volatile and nonvolatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

Moreover, the controller 180 is able to perform a pattern recognizing process for recognizing a writing input and a picture drawing input carried out on the touchscreen as characters or images, respectively.

The controller 180 may include a multimedia module 181 that provides multimedia playback. The multimedia module 181 may be configured as part of the controller 180, or implemented as a separate component.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However such teachings apply equally to other types of mobile terminals.

Figure 2:
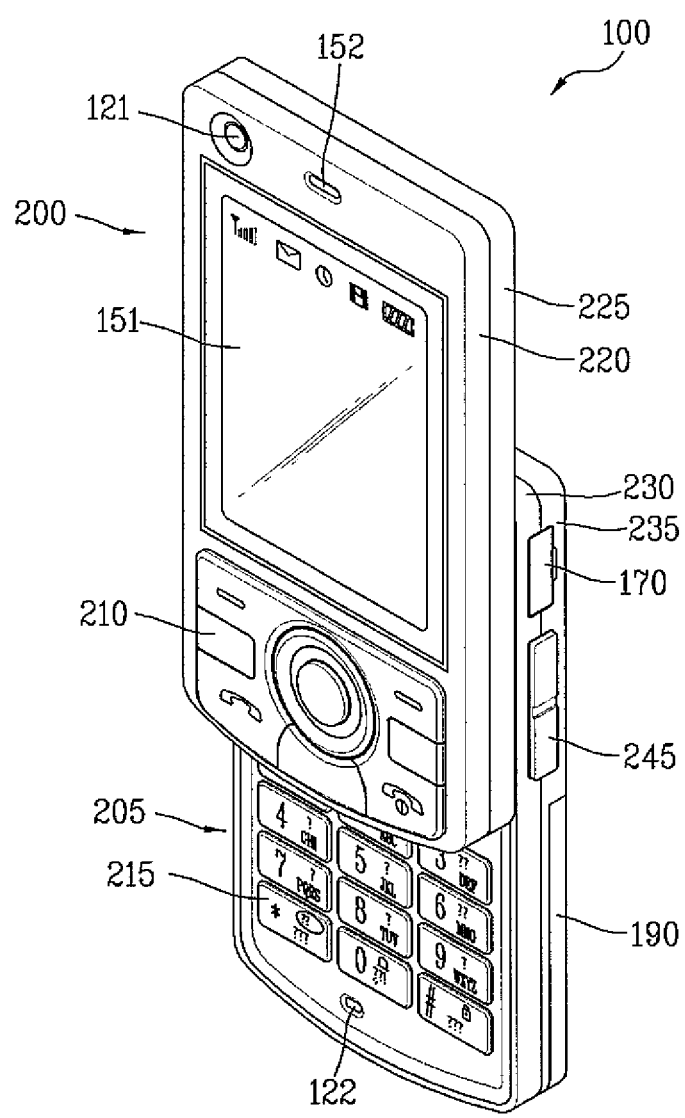
FIG. 2 is a perspective diagram of a front side of a mobile terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 described in FIG. 1 may include a first input unit such as function keys and four directional keys 210, a second input unit such as keypad 215 and a third input unit such as side keys 245. The function keys 210 are associated with the first body 200, and the keypad 215 is associated with the second body 205. The keypad includes various keys such as numbers, characters, and symbols to enable a user to place a call, prepare a text or multimedia message, and otherwise operate the mobile terminal 100.

The first body 200 slides relative to the second body 205 between open and closed positions. Although not shown in drawings, in case of a folder-type mobile terminal, a first body thereof folds and unfolds relative to a second body thereof between open and closed positions. In addition, in case of a swing-type mobile terminal, a first body thereof swings relative to a second body thereof between open and closed positions.

In a closed position, the first body 200 is positioned over the second body 205 in such a manner that the keypad 215 is substantially or completely obscured by the first body 200. In the open position, user access to the keypad 215 is possible. The function keys 210 are conveniently configured for a user to enter commands such as start, stop and scroll.

The mobile terminal 100 is operable in either a standby mode, in which it is able to receive a call or message and to receive and respond to network control signaling or an active call mode. Typically, the mobile terminal 100 functions in the standby mode in the closed position and in an active mode in the open position. This mode configuration may be changed as required or desired.

The first body 200 is shown formed from a first case 220 and a second case 225. The second body 205 is shown formed from a first case 230 and a second case 235. The first case 230 and second case 235 are usually formed from a suitably rigid material, such as injection molded plastic, or formed using metallic material, such as stainless steel (STS) and titanium (Ti).

One or more intermediate cases may be provided between the first case 230 and second case 235 of one or both of the first body 200 and second body 205. The first body 200 and second body 205 are typically sized to receive electronic components necessary to support operation of the mobile terminal 100.

The first body 200 is shown having a camera 121 and audio output unit 152, which is configured as a speaker, positioned relative to the display 151. The camera 121 may be constructed such that it can be selectively positioned relative to first body 200 such as by rotation or, swiveling.

The function keys 210 are positioned adjacent to a lower side of the display 151, which is shown implemented as an LCD or OLED. The display may also be configured as a touch screen having an underlying touchpad which generates signals responsive to user contact with the touchscreen, such as with a finger or stylus.

The second body 205 is shown having a microphone 122 positioned adjacent to the keypad 215 and having side keys 245, which are one type of a user input unit as mentioned above, positioned along the side of second body 205. Preferably, the side keys 245 may be configured as hot keys, such that the side keys are associated with a particular function of the mobile terminal 100. An interface unit 170 is shown positioned adjacent to the side keys 245, and a power supply 190 in a form of a battery is shown located on a lower portion of the second body 205.

Figure 3:
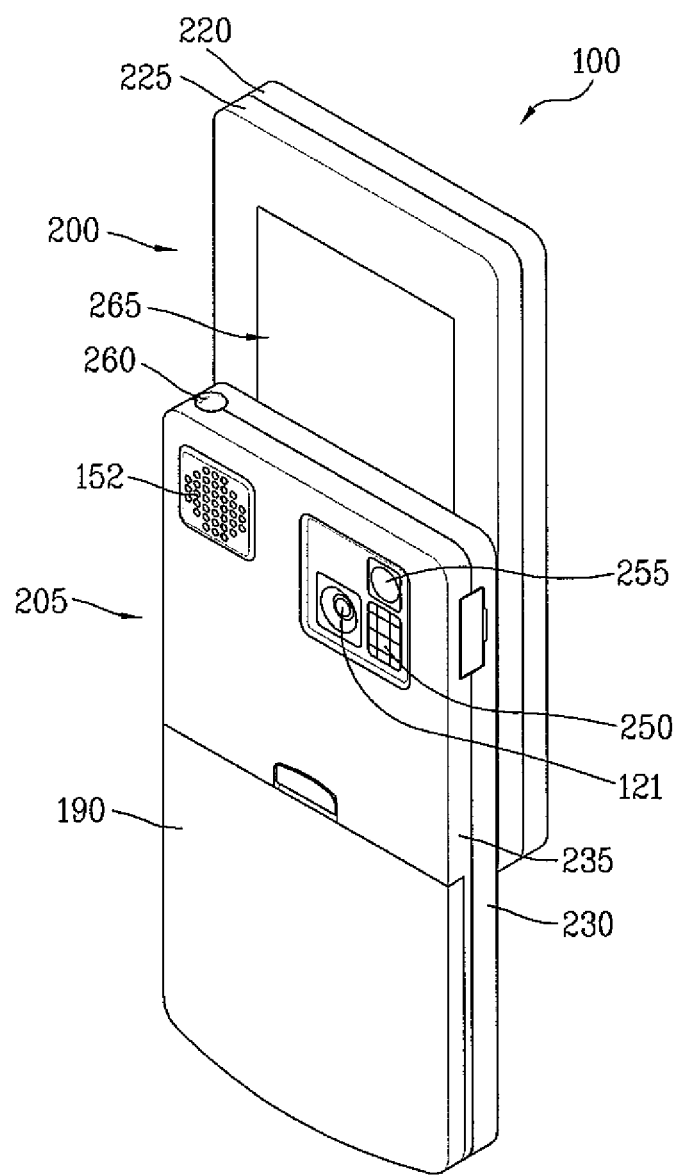
FIG. 3 is a perspective diagram of a backside of the mobile terminal shown in FIG. 2.

FIG. 3 is a rear view of the mobile terminal 100 shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 faces a direction which is opposite to a direction faced by the camera 121 of the first body 200 (FIG. 2). Each of the cameras 121 of the first body 200 and second body 205 may have the same or different capabilities.

In an embodiment, the camera 121 of the first body 200 operates with a relatively lower resolution than the camera 121 of the second body 205. Such an arrangement works well during a video conference, for example, in which reverse link bandwidth capabilities may be limited. The relatively higher resolution of the camera 121 of the second body 205 (FIG. 3) is useful for obtaining higher quality pictures for later use or for communicating with other parties.

The second body 205 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205. The antenna 260 functions in cooperation with the broadcast receiving module 111 (FIG. 1). The antenna 260 may be fixed or configured to retract into the second body 205. The rear side of the first body 200 includes a slide module 265, which slidably couples with a corresponding slide module located on the front side of the second body 205.

It is understood that the illustrated arrangement of the various components of the first body 200 and second body 205 may be modified as required or desired. In general, some or all of the components of one body may alternatively be implemented on the other body. In addition, the location and relative positioning of such components are not critical to many embodiments, and therefore, the components may be positioned at locations which differ from those shown by the representative figures.

The mobile terminal 100 of FIGS. 1-3 may be configured to operate within a communication system which transmits data via frames or packets, including both wireless and wired communication systems, and satellite-based communication systems. Such communication systems utilize different air interfaces and/or physical layers.

Examples of air interfaces utilized by the communication systems include for example, frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
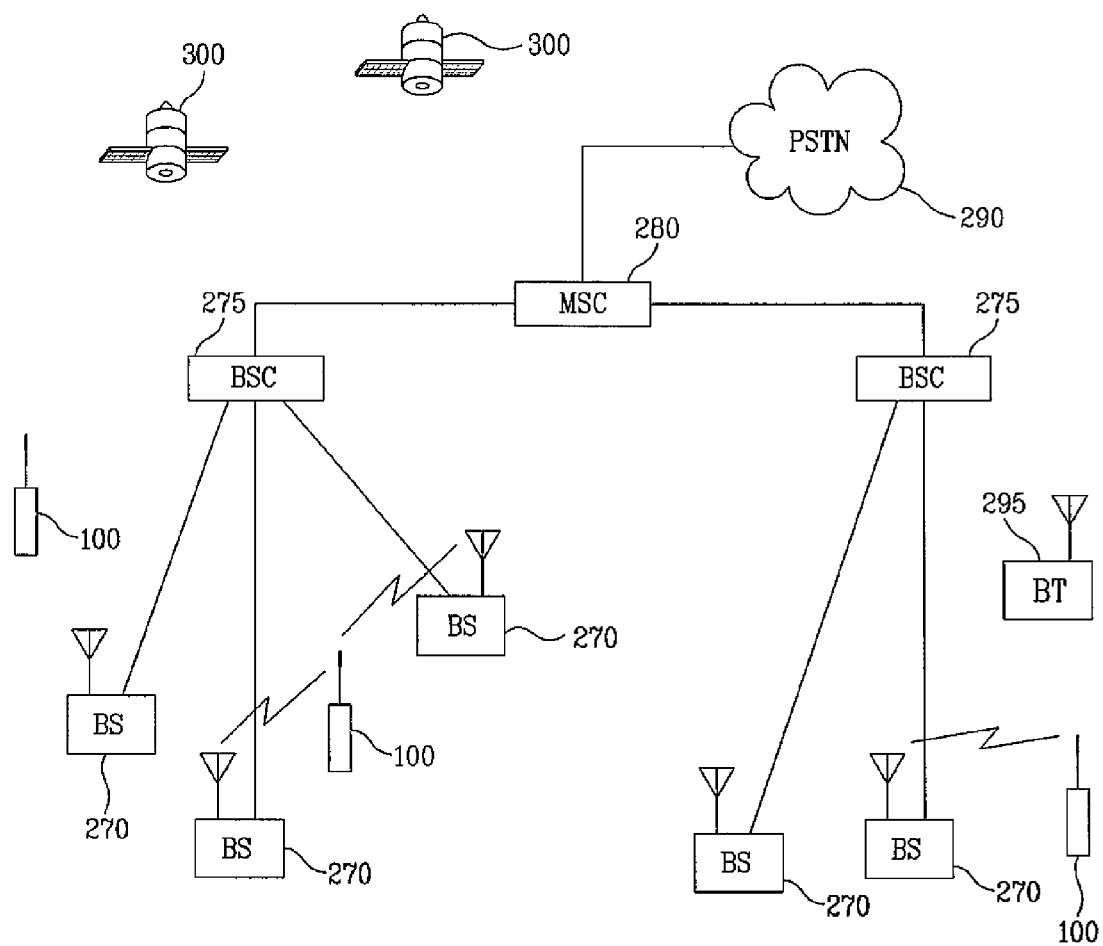
FIG. 4 is a block diagram of a wireless communication system in which a mobile terminal according to the present invention is operable.

Referring to FIG. 4, a CDMA wireless communication system is shown having a plurality of mobile terminals 100, a plurality of base stations 270, a plurality of base station controllers (BSCs) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omni-directional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations 270 may also be denoted as "cell sites." Alternatively, individual sectors of a given base station 270 may be referred to as cell sites.

A terrestrial digital multimedia broadcasting (DMB) transmitter 295 is shown broadcasting to mobile terminals 100 operating within the system. The broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further depicts several global positioning system (GPS) satellites 300. Such satellites facilitate locating the position of some or all of the mobile terminals 100. Two satellites are depicted, but it is understood that useful positioning information may be obtained with greater or fewer satellites.

The position-location module 115 (FIG. 1) of the mobile terminal 100 is typically configured to cooperate with the satellites 300 to obtain desired position information. It is to be appreciated that other types of position detection technology, such as location technology that may be used in addition to or instead of GPS location technology, may alternatively be implemented. Some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 engage in calls, messaging, and other communications.

Each reverse-link signal received by a given base station 270 is processed within that base station 270. The resulting data is forwarded to an associated BSC 275.

The BSC 275 provides call resource allocation and mobility management functionality including soft handoffs between the base stations 270. The BSCs 275 also route the received data to the MSC 280, which provides additional routing services for interfacing with the PSTN 290.

Similarly, the PSTN interfaces with the MSC 280, and the MSC 280 interfaces with the BSCs 275. The BSCs 275 control the base stations 270 to transmit sets of forward-link signals to the mobile terminals 100.

In the following description, a control method applicable to the above-configured mobile terminal 100 is explained with respect to various embodiments. It is understood that the following embodiments can be implemented independently or through combinations thereof.

The following embodiments are more easily implemented if the display module 151 includes a touchscreen. In the following description, a display screen of the touchscreen 151 will be indicated by a reference number 400.

A method of controlling a mobile terminal according to a first embodiment of the present invention is explained with reference to FIG. 5 and FIG. 6 as follows.

Figure 5:
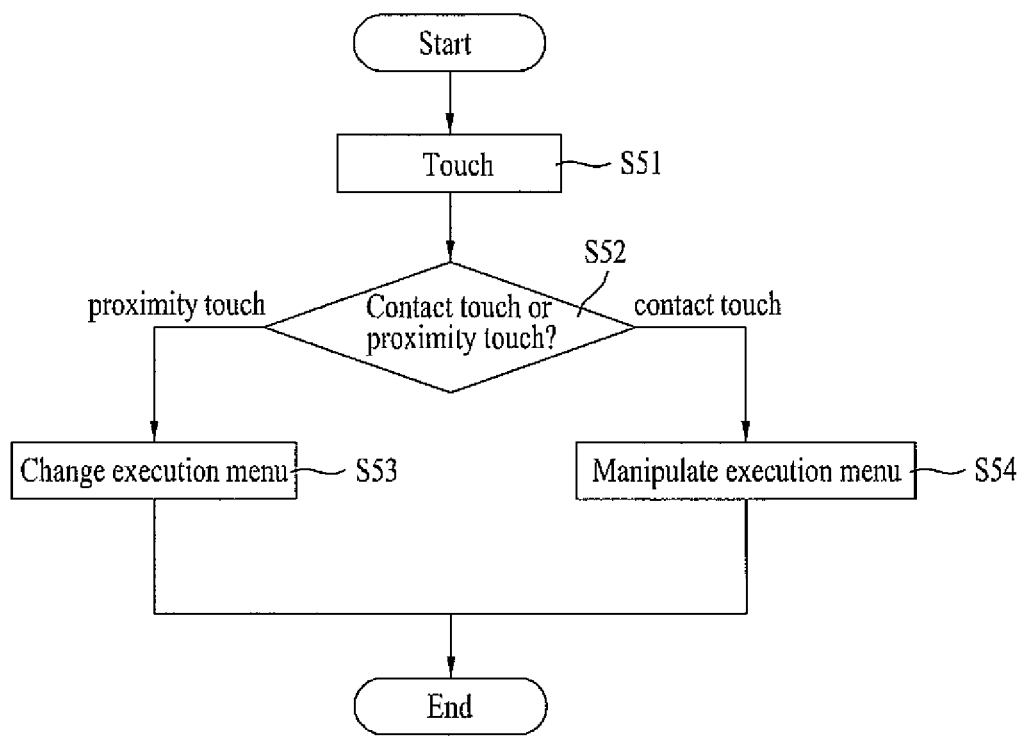
FIG. 5 is a flowchart of a method of controlling a mobile terminal according to a first embodiment of the present invention.
Figure 6:
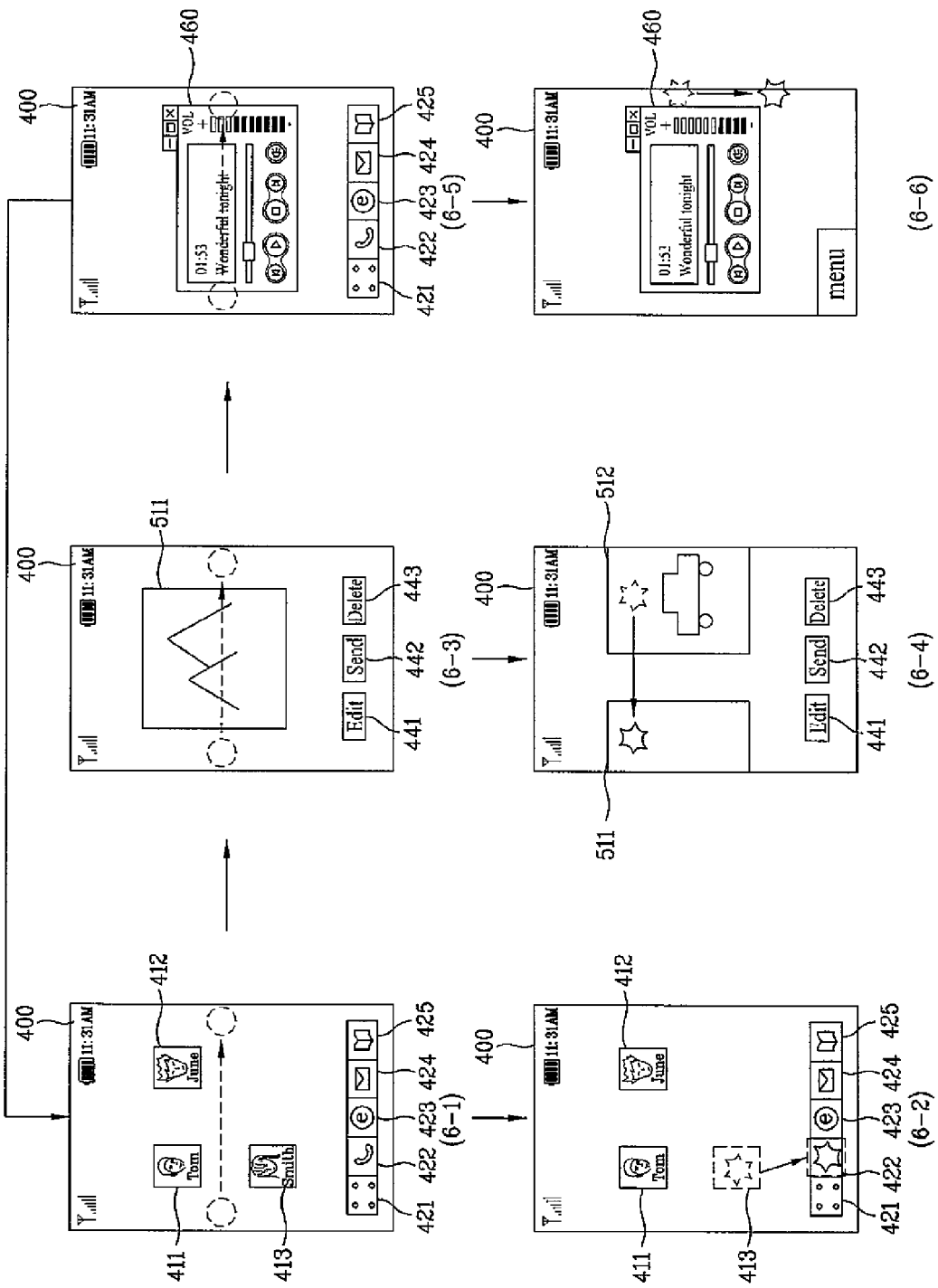
FIG. 6 is a state diagram of a display screen on which a method of controlling a mobile terminal according to a first embodiment of the present invention is implemented.

FIG. 5 is a flowchart of a method of controlling a mobile terminal according to a first embodiment of the present invention, and FIG. 6 is a state diagram of a display screen on which a method of controlling a mobile terminal according to a first embodiment of the present invention is implemented.

Referring to (6-1) of FIG. 6, an image (i.e., a standby image) according to a standby mode is displayed on a touchscreen 400. There can be various kinds of standby images. In particular, correspondent phone number icons 411, 412 and 413 and menu icons 421, 422, 423, 424 and 425, as shown in (6-1) of FIG. 6, are exemplarily displayed.

Referring to FIGS. 5 and 6, a specific icon 413 among the phone number icons, as shown in (6-2) of FIG. 6, may be contact-touched by a pointer (e.g., finger, stylus pen, etc.) [S51] and then dragged to a specific menu icon 422 among the menu icons.

If so, the controller 180 recognizes that the drag of the pointer is a contact touch and drag [S52]. The controller 180 then executes a function assigned to the menu icon 422 for the dragged phone number icon 413 [S54].

Meanwhile, in the state shown in (6-1) of FIG. 6, the pointer may be proximity-touch a prescribed position on the touchscreen 400 [S51] and then be dragged in a first prescribed direction (e.g., left to right).

If so, the controller 180 recognizes that the drag of the pointer is a proximity touch and drag [S52]. The controller 180 then changes an execution menu, as shown in (6-3) of FIG. 6, in the terminal [S53]. In particular, the mobile terminal 100 may change the standby image menu into an image viewing menu (e.g., menu for still picture, moving picture, or flash picture).

While the image viewing menu is executed in the mobile terminal 100, a contact touch may be dragged in a second prescribed direction (e.g., right to left) on the touchscreen 400. If so, an image displayed on the touchscreen 400, as shown in (6-4) of FIG. 6, is switched. In this case, the second prescribed direction of the contact touch and drag for the image switch may be identical to or different from the first prescribed direction of the proximity touch and drag for the execution menu change.

While the state shown in (6-3) of FIG. 6 is maintained, the pointer may proximity-touch a prescribed position on the touch screen 600 and then be dragged in the first prescribed direction again.

If so, the controller 180 recognizes that the drag is a proximity touch and drag. The controller 180 then changes the execution menu, as shown in (6-5) of FIG. 6, in the mobile terminal 100. In particular, the mobile terminal 100 may change the execution menu from the image viewing menu into an audio file play menu.

While the audio file play menu is executed in the mobile terminal 100, the contact touch and drag, as shown in (6-6) of FIG. 6, is carried out on the touchscreen 400 in a third prescribed direction (e.g., up to down, or down to up). If so, a level of volume may be adjusted in the course of the audio file playback, or an executed audio file can be switched to a previous file or a next file. In this case, the third prescribed direction may be identical to or different from the above-mentioned first or second prescribed direction.

While the state shown in (6-5) of FIG. 6 is maintained, the pointer may proximity-touch a prescribed position on the touchscreen 400 and then be dragged in the first prescribed direction (e.g., left to right) again.

If so, the controller 180 recognizes that the drag corresponds to a proximity touch and drag. The controller 180 then changes the execution menu, as shown in (6-1) of FIG. 6, in the terminal. In particular, the mobile terminal 100 may be switched to the standby mode from the audio file play menu.

As mentioned in the foregoing description, if the pointer proximity-touches the touchscreen and is then dragged to a prescribed direction, the controller 180 changes an execution menu within the terminal. The above description is based on the assumption that the standby mode of the terminal is a sort of execution menu. Alternatively, the present embodiment can be configured in a manner that the terminal enters a menu mode from the standby mode through a prescribed manipulation, executes a prescribed menu, recognizes the proximity touch and drag, and then changes an execution menu. In the above description, the image viewing menu or the audio file play menu is exemplarily proposed as the execution menu. However, the present invention can further include more execution menus (e.g., photo capturing menu, broadcast receiving menu, etc.).

Meanwhile, if the pointer contact-touches the touchscreen and is then dragged, the controller 180 recognizes that a prescribed command is inputted to the execution menu within the terminal.

Accordingly, if the proximity touch and drag is performed on the touchscreen, the execution menu is changed. If the contact touch and drag is performed on the touchscreen, a prescribed command is inputted within the executed menu. Optionally, the present invention can be configured in a manner that an execution menu is changed if the contact touch and drag is performed, or that a prescribed command is inputted within an executed menu if the proximity touch and drag is performed. Optionally, although a drag is not carried out, the present invention can be configured in a manner that an execution menu is changed if a proximity touch is performed on the touchscreen, or that a prescribed command is inputted within an executed menu if a contact touch is performed on the touchscreen.

A method of controlling a mobile terminal according to a second embodiment of the present invention is explained with reference to FIG. 7 and FIG. 8 as follows.

Figure 7:
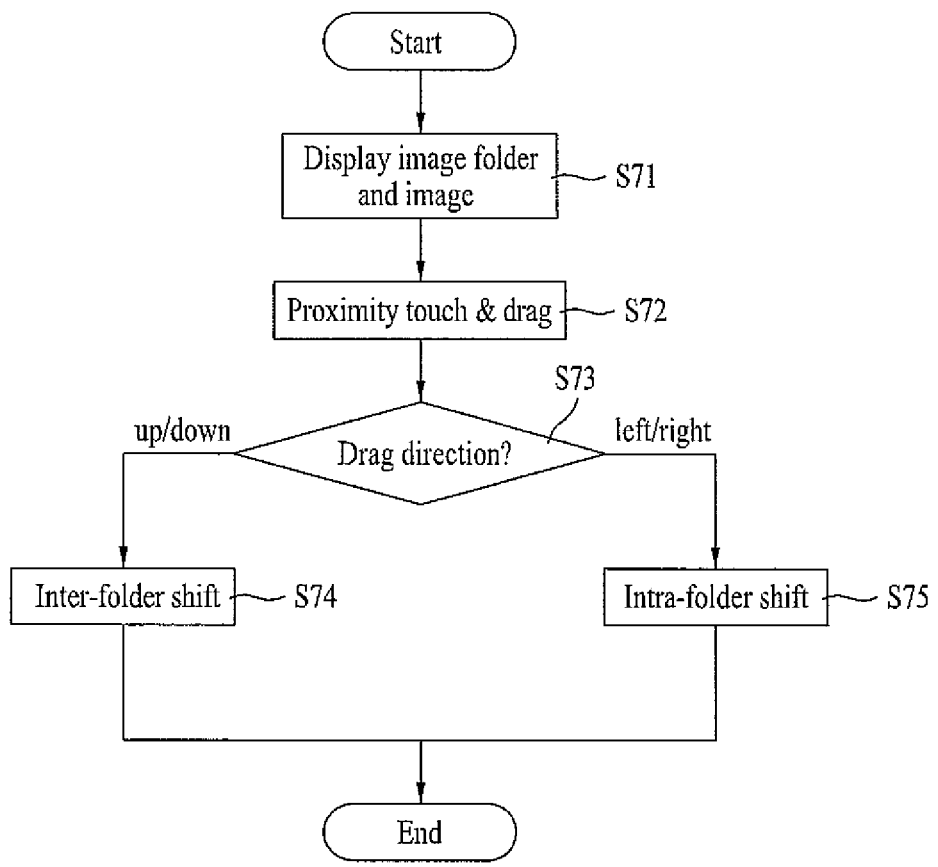
FIG. 7 is a flowchart of a method of controlling a mobile terminal according to a second embodiment of the present invention.
Figure 8:
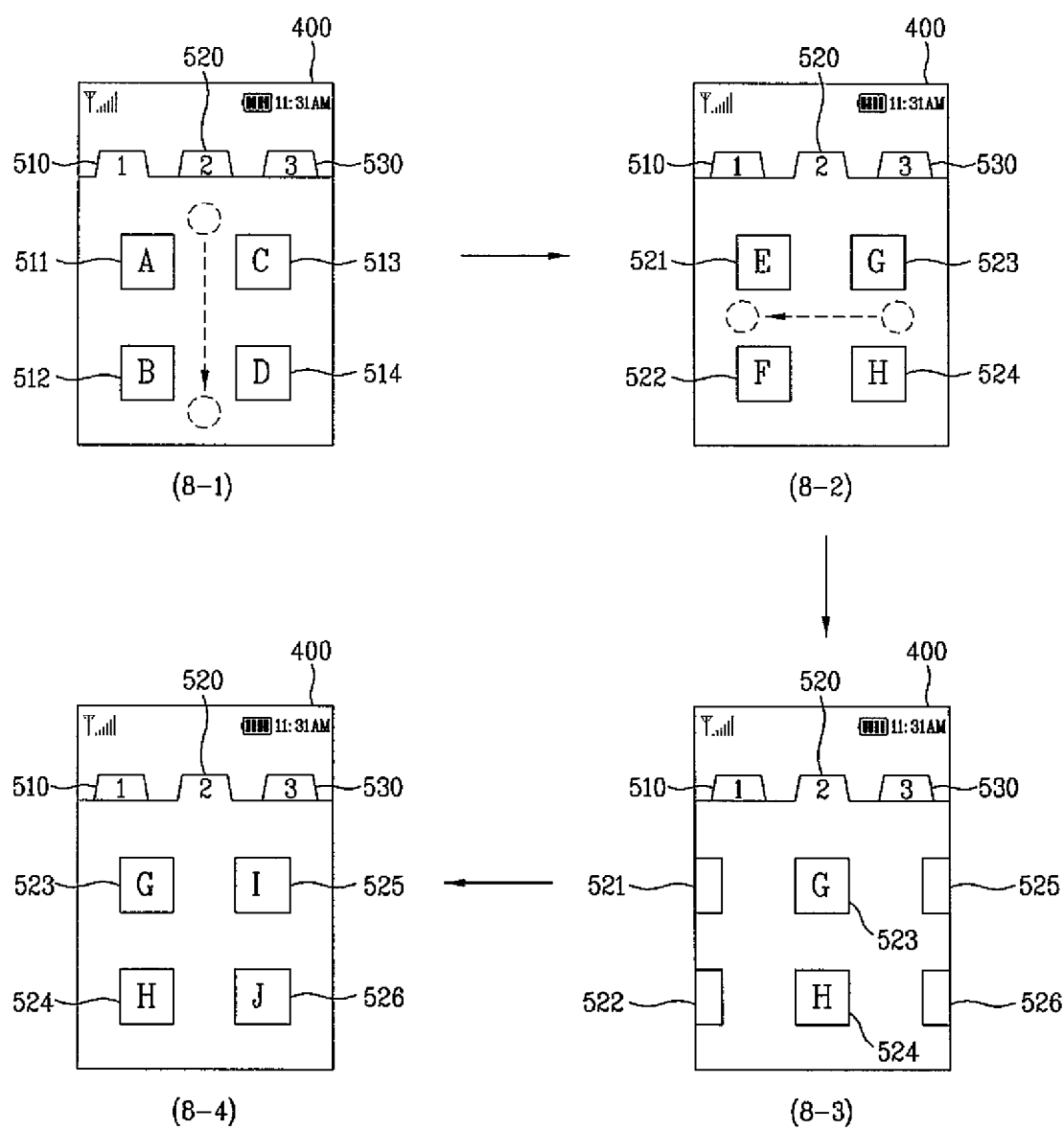
FIG. 8 is a state diagram of a display screen on which a method of controlling a mobile terminal according to a second embodiment of the present invention is implemented.

FIG. 7 is a flowchart of a method of controlling a mobile terminal according to a second embodiment of the present invention, and FIG. 8 is a state diagram of a display screen on which a method of controlling a mobile terminal according to a second embodiment of the present invention is implemented.

Referring to FIG. 7 and FIG. 8, the following description is based on an image viewing menu for viewing images stored in the memory 160 being executed in the mobile terminal 100 through a prescribed manipulation of the user input unit 130. Preferably, the images are classified into folders and stored in the memory 160. The images may include still pictures, moving pictures, flash pictures and/or the like.

Referring to FIG. 7 and (8-1) of FIG. 8, while an image viewing menu is being executed in the mobile terminal 100, three image folders, i.e., first to third folders 510, 520 and 530 are displayed on the touchscreen 400 of the mobile terminal 100. In particular, the first folder 510 among the three image folders is activated and images within the first folder 510 are displayed on the touchscreen 400 [S71].

In (8-1) of FIG. 8, shown is that four images are contained in the first folder 510. Yet, the first folder 510 is not limited to the four images only. More images may be contained in the first folder 510 in addition to the four images but are not displayed due to a limited size of the touchscreen 400.

In accordance with the present invention, a pointer may cross over the touchscreen 400 up to down (or down to up) to perform a proximity touch and drag [S72]. If so, the controller 180 recognizes that a direction of the proximity touch and drag is the up-to-down direction, and also recognizes that the up-to-down proximity touch and drag corresponds to a folder switching command. The controller 180 then enables images within the second folder 520 to be displayed on the touchscreen 400, as shown in (8-2) of FIG. 8, by activating a folder other than the first folder 510 (e.g., the second folder 520) on the touchscreen 400 [S73, S74].

In (8-2) of FIG. 8, shown is that four images are contained in the second folder 520. Yet, the second folder 520 is not limited to the four images only. As mentioned in the foregoing description, more images can be contained in the second folder 520 in addition to the four images.

Subsequently, the pointer may perform a proximity touch and drag by crossing over the touchscreen 400 right to left (or left to right) [S72]. If so, the controller 180 recognizes that a direction of the proximity touch and drag corresponds to a left-to-right direction, and also recognizes that the left-to-right proximity touch and drag corresponds to an image switching command with the folder. The controller 180 then controls the images 521 and 522 of the second folder 520 to disappear by sliding out of the touchscreen 400, and also controls new images 525 and 526 to appear by sliding into the touchscreen 400, as shown in (8-3) and (8-4) of FIG. 8 [S73, S75].

A method of controlling a mobile terminal according to a third embodiment of the present invention is explained with reference to FIG. 9 and FIG. 10 as follows.

Figure 9:
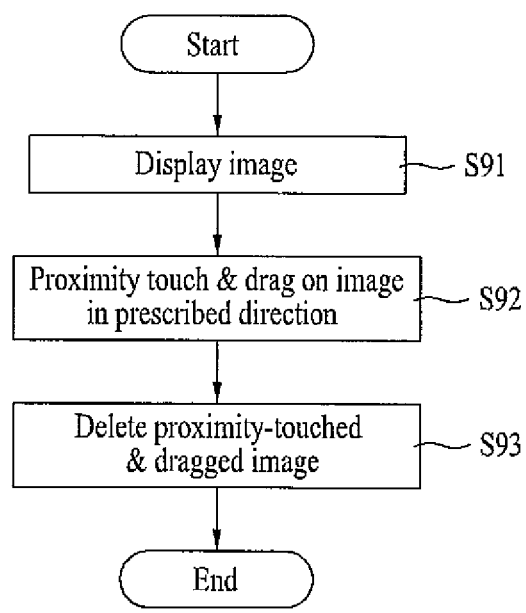
FIG. 9 is a flowchart of a method of controlling a mobile terminal according to a third embodiment of the present invention.
Figure 10:
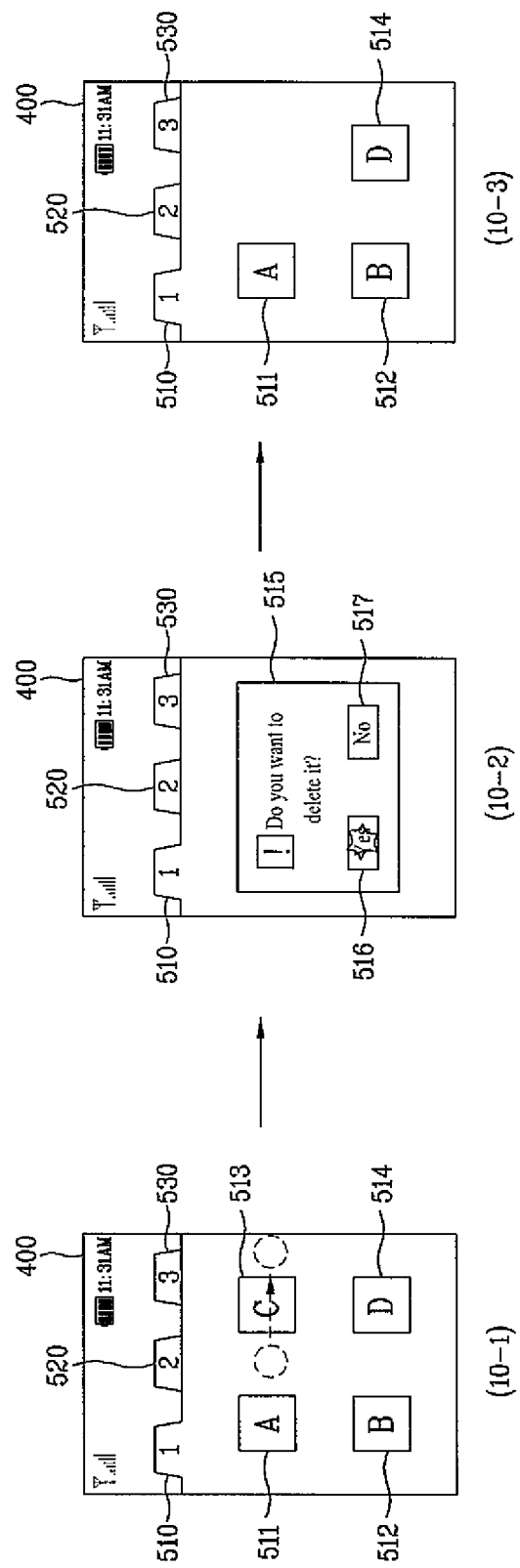
FIG. 10 is a state diagram of a display screen on which a method of controlling a mobile terminal according to a third embodiment of the present invention is implemented.

FIG. 9 is a flowchart of a method of controlling a mobile terminal according to a third embodiment of the present invention, and FIG. 10 is a state diagram of a display screen on which a method of controlling a mobile terminal according to a third embodiment of the present invention is implemented.

Referring to FIG. 9 and FIG. 10, the following description is based on an image viewing menu for viewing images stored in the memory 160 being executed in the mobile terminal 100 through a prescribed manipulation of the user input unit 130. The images may include still pictures, moving pictures, flash pictures and/or the like.

Referring to FIG. 9 and (10-1) of FIG. 10, the mobile terminal 100 executes the image viewing menu and a plurality of images 511, 512, 513 and 514 are displayed on the touchscreen 400 [S91].

In accordance with the present invention, a pointer may proximity-touch a specific image 513 among the plurality of images and drag the image in a prescribed direction [S92]. For instance, the pointer may repeatedly proximity-touch and drag the touchscreen near the image 513 as if a virtual eraser rubs the image 513 over a predetermined time and/or area.

If so, a window 515 for querying whether the image will be deleted, as shown in (10-2) of FIG. 10, is displayed on the touchscreen 400. If a 'Yes' icon 516 is selected from the window 515, the image 513, as shown in (10-3) of FIG. 10, is deleted from the touchscreen 400 [S93].

Alternatively, when the pointer proximity-touches and drags the image 513 in a prescribed direction, a trashcan type indicator may be created [not shown in the drawing]. Hence, the image 513 may be deleted by being dragged and dropped into the trashcan type indicator.

A method of controlling a mobile terminal according to a fourth embodiment of the present invention is explained with reference to FIG. 11 and FIG. 12 as follows.

Figure 11:
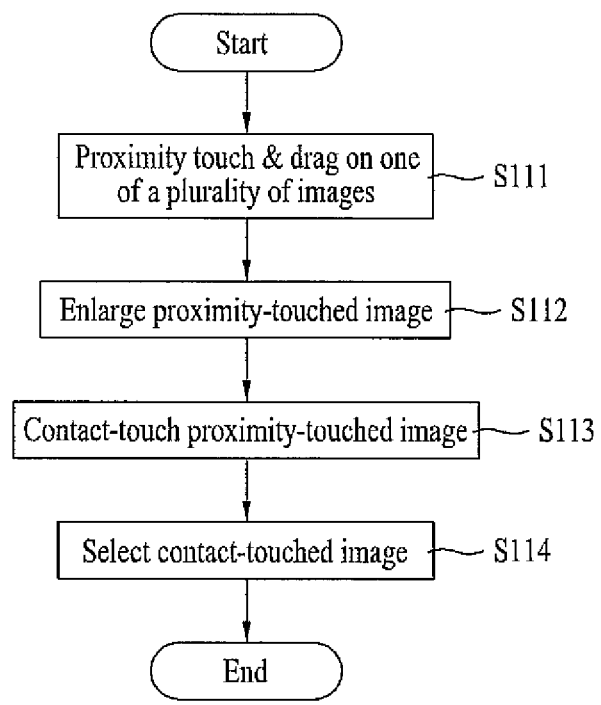
FIG. 11 is a flowchart of a method of controlling a mobile terminal according to a fourth embodiment of the present invention.
Figure 12:
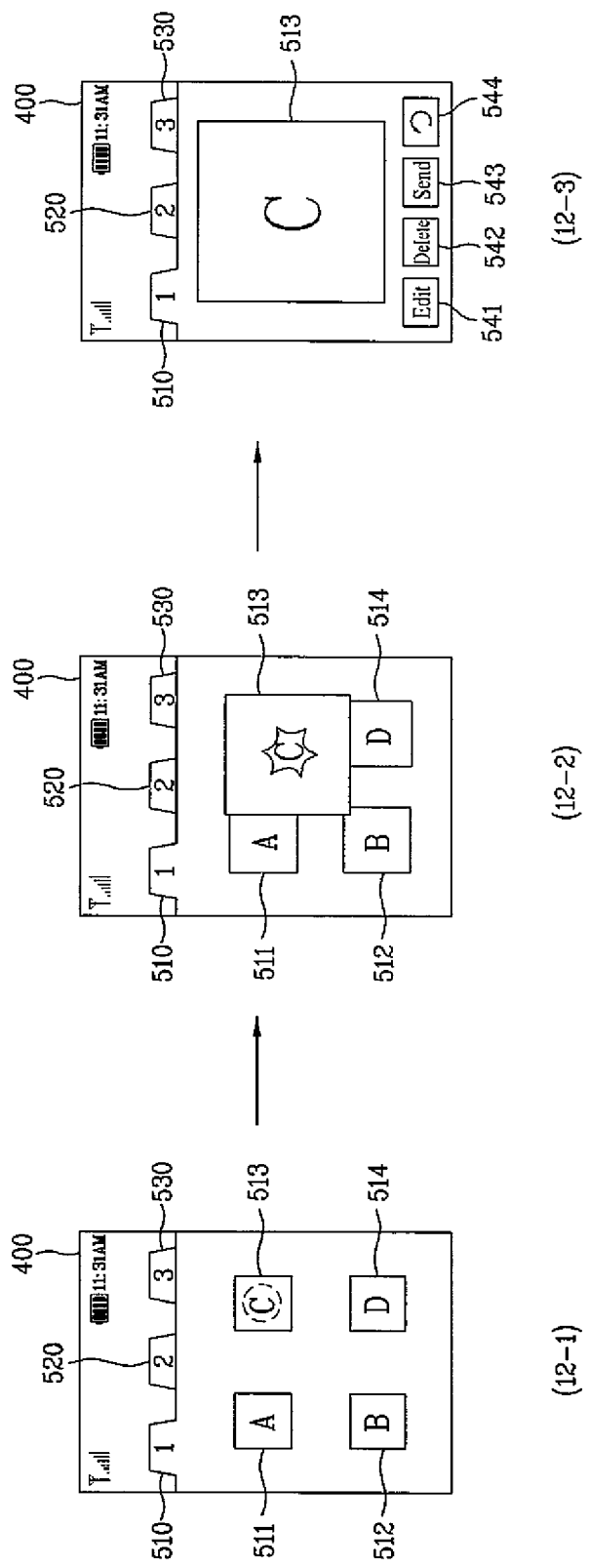
FIG. 12 is a state diagram of a display screen on which a method of controlling a mobile terminal according to a fourth embodiment of the present invention is implemented.

FIG. 11 is a flowchart of a method of controlling a mobile terminal according to a fourth embodiment of the present invention, and FIG. 12 is a state diagram of a display screen on which a method of controlling a mobile terminal according to a fourth embodiment of the present invention is implemented.

Referring to FIG. 11 and FIG. 12, the following description is based on an image viewing menu for viewing images stored in the memory 160 being executed in the mobile terminal 100 through a prescribed manipulation of the user input unit 130. The images may include still pictures, moving pictures, flash pictures and/or the like.

Referring to FIG. 11 and (12-1) of FIG. 12, the mobile terminal 100 executes the image viewing menu and a plurality of images 511, 512, 513 and 514 are displayed on the touchscreen 400. In accordance with the present invention, a pointer, as shown in (12-1) of FIG. 12, may proximity-touch a specific image 513 among the plurality of images 511, 512, 513 and 514 [S111].

Referring to (12-2) of FIG. 12, after being proximity-touched, the image 513 is enlarged and displayed on the touchscreen 400 [S112]. Preferably, magnification of the enlarged image may be configured to be proportional to an extent of proximity when the pointer approaches the image 513. In this case, if the proximity touch is released from the image 513, the image 513, as shown in (12-1) of FIG. 12, is displayed in its original size on the touchscreen 400.

Subsequently, the pointer may continue to approach the image 513 to perform a contact touch [S113]. Referring to (12-3) of FIG. 12, after being contact touched, the image 513 is selected from the plurality of images to be displayed on the touchscreen 400 in an enlarged state, such that the image covers the rest of the images 511, 512 and 514 on the touchscreen [S114]. Preferably, even if the contact touch is released from the image 513, the image 513 maintains its enlarged and selected state.

Referring to (12-3) of FIG. 12, various icons 541, 542, 543 and 544 for processing the image 513 are exemplarily displayed on a prescribed area of the touchscreen 400. In addition to the various icons shown in (12-3) of FIG. 12, other icons are displayable on the touchscreen 400 if necessary.

Through the various displayed icons, the selected image may be edited, deleted, sent to a correspondent party, and set as a background image. This is apparent to those skilled in the art without further explanation and its details will be omitted in the description.

A method of controlling a mobile terminal according to a fifth embodiment of the present invention is explained with reference to FIG. 13 and FIG. 14 as follows.

Figure 13:
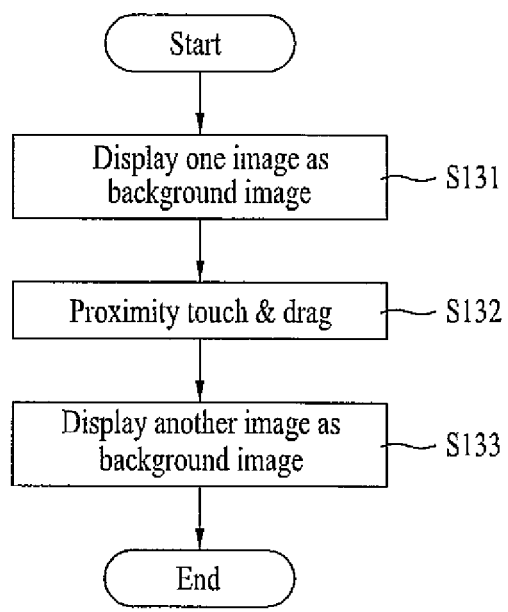
FIG. 13 is a flowchart of a method of controlling a mobile terminal according to a fifth embodiment of the present invention.
Figure 14:
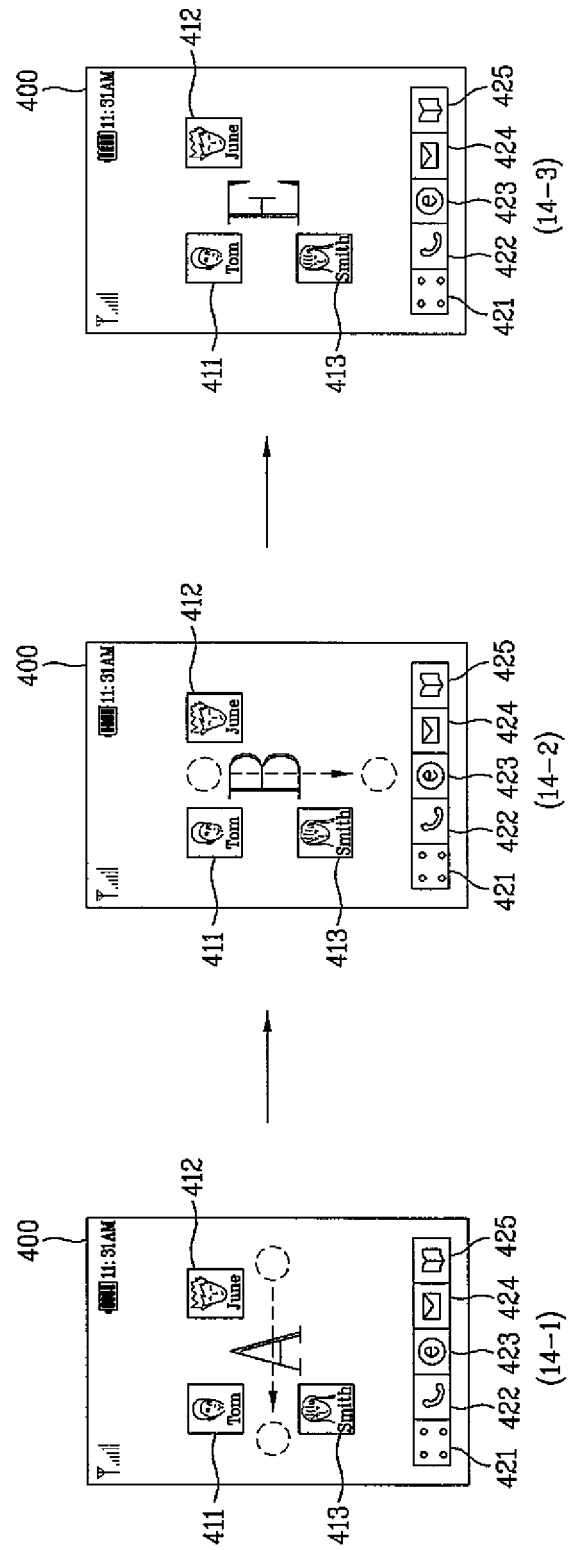
FIG. 14 is a state diagram of a display screen on which a method of controlling a mobile terminal according to a fifth embodiment of the present invention is implemented.

FIG. 13 is a flowchart of a method of controlling a mobile terminal according to a fifth embodiment of the present invention, and FIG. 14 is a state diagram of a display screen on which a method of controlling a mobile terminal according to a fifth embodiment of the present invention is implemented.

Referring to (14-1) of FIG. 14, an image according to a standby mode, i.e., a standby image may be displayed on the touchscreen 400. There can exist various kinds of standby images. In (14-1) of FIG. 14, exemplarily shown is a case that correspondent phone number icons 411, 412 and 413 and menu icons 421, 422, 423, 424 and 425 are displayed on the touchscreen 400.

Referring to FIGS. 13 and 14, an image stored in the memory 160 may be displayed as a background image on the touchscreen 400 [S131]. Preferably, the images, as shown in FIG. 8, are stored in the memory 160 by being classified into folders. In (14-1) of FIG. 14, an image A (511) of the first folder 510 shown in (8-1) of FIG. 8 is preferably displayed as a background image.

In accordance with the present invention, a pointer, as shown in (14-1) of FIG. 14, may proximity-touch the touchscreen 400 and then be dragged in a first prescribed direction (e.g., right to left, or left to right) [S132]. If so, another image B (512) of the first folder 510, as shown in (14-2) of FIG. 13, may be displayed as a background image [S133]. In particular, each time the proximity touch and drag is carried out on the touchscreen 400 in the first prescribed direction, each of the images within the first folder 510 is displayed as a background image in prescribed order.

Referring to (14-2) of FIG. 14, the pointer may proximity-touch the touchscreen 400 and then be dragged in a second prescribed direction (e.g., up to down, or down to up) [S132]. If so, an image E of a folder other than the first folder 510, as shown in (14-3) of FIG. 14, may be displayed as a background image [S133]. Hence, a terminal user is facilitated to switch an image of a background using the proximity-touch and drag action.

A method of controlling a mobile terminal according to a sixth embodiment of the present invention is explained in detail with reference to FIGS. 15 to 17 as follows.

Figure 15:
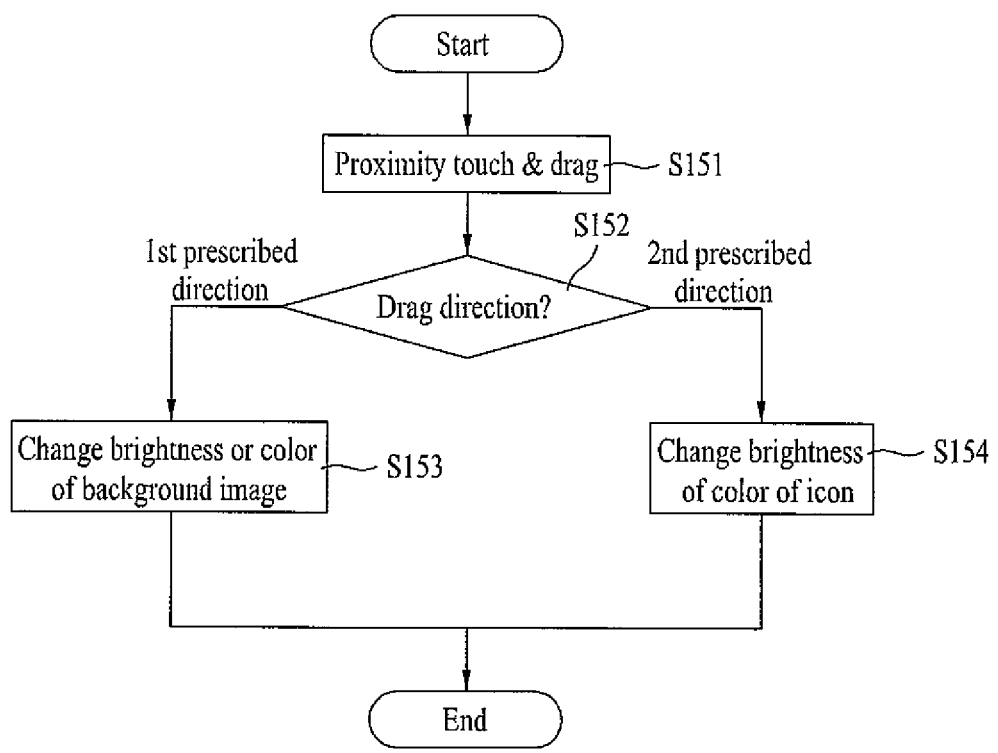
FIG. 15 is a flowchart of a method of controlling a mobile terminal according to a sixth embodiment of the present invention.
Figure 16:
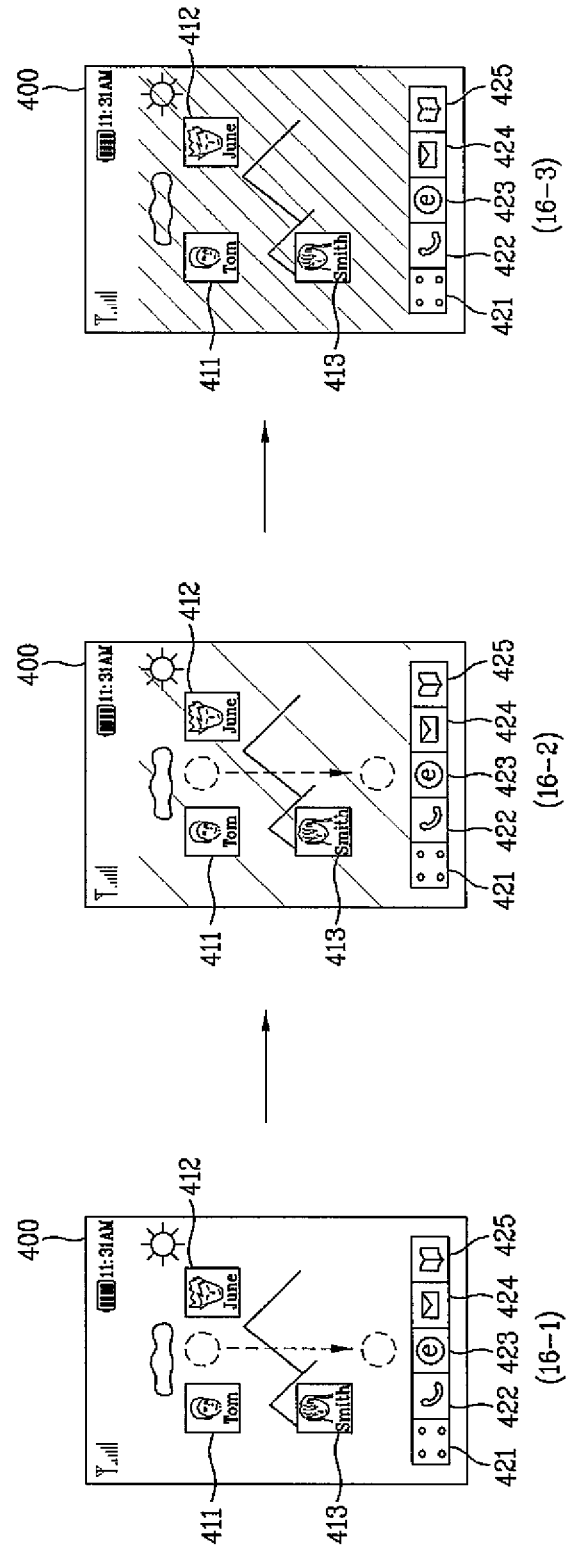
FIG. 16 and FIG. 17 are state diagrams of a display screen on which a method of controlling a mobile terminal according to a sixth embodiment of the present invention is implemented.
Figure 17:
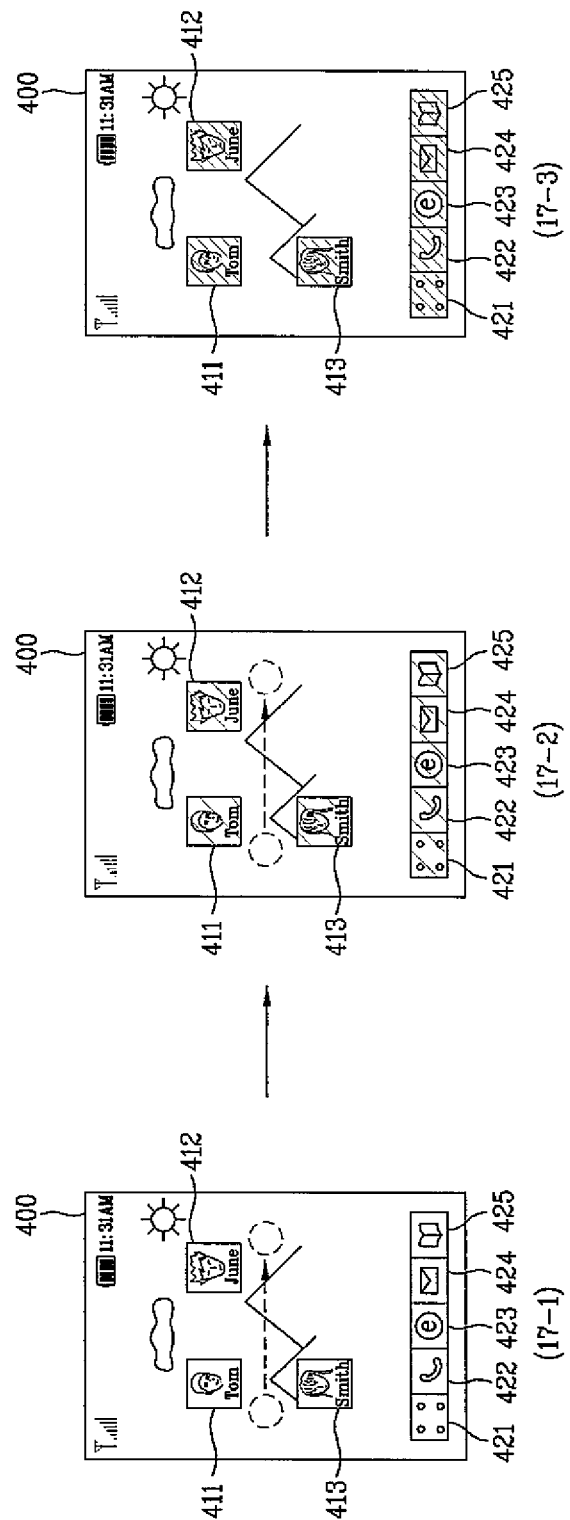

FIG. 15 is a flowchart of a method of controlling a mobile terminal according to a sixth embodiment of the present invention, and FIG. 16 and FIG. 17 are state diagrams of a display screen on which a method of controlling a mobile terminal according to a sixth embodiment of the present invention is implemented.

Referring to (16-1) of FIG. 16, an image according to a standby mode (i.e., a standby image) is displayed on the touchscreen 400. There can exist various kinds of standby images. In (16-1) of FIG. 16, shown is an example that correspondent phone number icons 411, 412 and 413 and menu icons 421, 422, 423, 424 and 425 are displayed on the touchscreen 400.

Referring to FIGS. 15 and 16, and in accordance with the present invention, a pointer, as shown in (16-1) of FIG. 16, may proximity-touch the touchscreen 400 and then be dragged in a first prescribed direction (e.g., up to down) [S151]. If so, the controller 180 decides that the drag direction corresponds to the first prescribed direction [S152].

Subsequently, the controller 180 may adjust at least one of a brightness and color of a background image, as shown in (16-2) of FIG. 16, according to the proximity touch and drag [S153]. In (16-2) of FIG. 16, shown is an example that the brightness of the background image is lowered according to the proximity touch and drag.

Referring to (16-2) of FIG. 16, the proximity touch and drag may be performed once more on the touchscreen 400 in the first prescribed direction. If so, the controller 180 further adjusts at least one of the brightness and color of the background image, as shown in (16-3) of FIG. 16. In (16-3) of FIG. 16, shown is an example that the brightness of the background image is further lowered according to the proximity touch and drag.

If the proximity touch and drag is performed in a direction reverse to the first prescribed direction, then at least one of the brightness and color of the background image is changed in a manner reverse to that of the change by the first prescribed direction [not shown in FIG. 16]. For instance, if the proximity touch and drag is performed on the touchscreen in a direction reverse to the first prescribed direction, i.e., in a down-to-up direction, the brightness of the background image may be raised. This is apparent to those skilled in the art without further explanation and its details will be omitted in the description.

A case of performing the proximity touch and drag on the touchscreen 400 in a second prescribed direction is explained with reference to FIG. 17 as follows.

Referring to (17-1) of FIG. 17, an image according to the standby mode (i.e., a standby image) is displayed on the touchscreen 400. There can exist various kinds of standby images. In (17-1) of FIG. 17, shown is an example that correspondent phone number icons 411, 412 and 413 and menu icons 421, 422, 423, 424 and 425 are displayed on the touchscreen 400.

Referring to FIGS. 15 and 17, and in accordance with the present invention, a pointer, as shown in (17-1) of FIG. 17, may proximity-touch the touchscreen 400 and then be dragged in a second prescribed direction (e.g., left to right) [S151]. If so, the controller 180 decides that the drag direction corresponds to the second prescribed direction [S152].

Subsequently, the controller 180 may adjust at least one of a brightness and color of the icons, as shown in (17-2) of FIG. 17, according to the proximity touch and drag [S154]. In (17-2) of FIG. 17, shown is an example that the brightness of the icons is lowered according to the proximity touch and drag.

Referring to (17-2) of FIG. 17, the proximity touch and drag may be performed once more on the touchscreen 400 in the second prescribed direction. If so, the controller 180 further adjusts at least one of the brightness and color of the icons, as shown in (17-3) of FIG. 17. In (17-3) of FIG. 17, shown is an example that the brightness of the icons is further lowered according to the proximity touch and drag.

If the proximity touch and drag is carried out in a direction reverse to the second prescribed direction, then at least one of the brightness and color of the icons is changed in a manner reverse to that of the change by the second prescribed direction [not shown in FIG. 17]. For instance, if the proximity touch and drag is performed on the touchscreen in a direction reverse to the second prescribed direction, i.e., in a right-to-left direction, the brightness of the icons may be raised. This is apparent to those skilled in the art without further explanation and its details will be omitted in the description.

In the above description, the case of changing the brightness or color of the background image or icon on the touchscreen is explained. Optionally, the present invention can be configured to change the brightness or the color of both the background image and the icon. Optionally, the present invention can be configured to change a shape of the background image or the icon (e.g., enlargement and reduction) when the proximity touch and drag is performed on the touchscreen. This is apparent to those skilled in the art without further explanation and its details will be omitted in the description.

A method of controlling a mobile terminal according to a seventh embodiment of the present invention is explained with reference to FIGS. 18 to 20 as follows.

Figure 18:
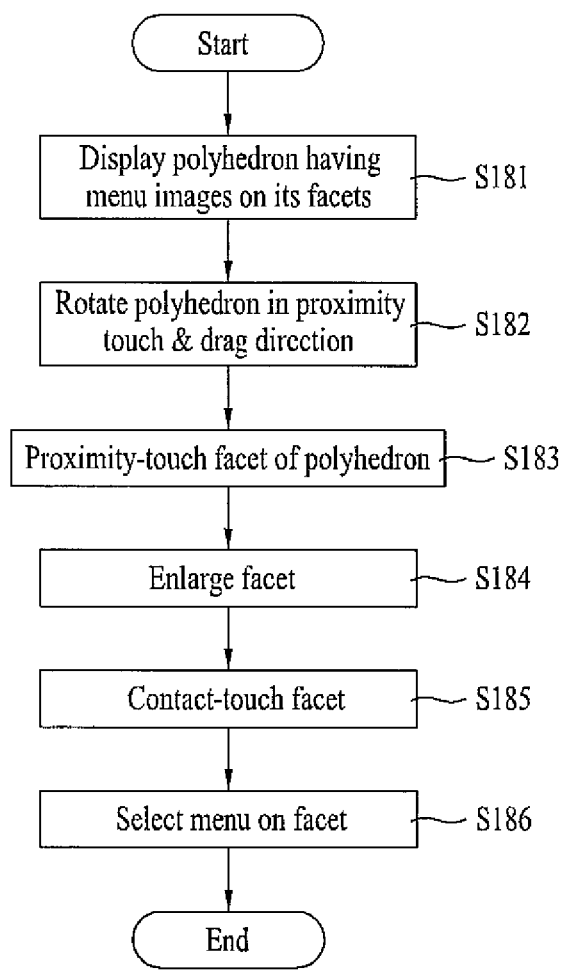
FIG. 18 is a flowchart of a method of controlling a mobile terminal according to a seventh embodiment of the present invention.
Figure 19:
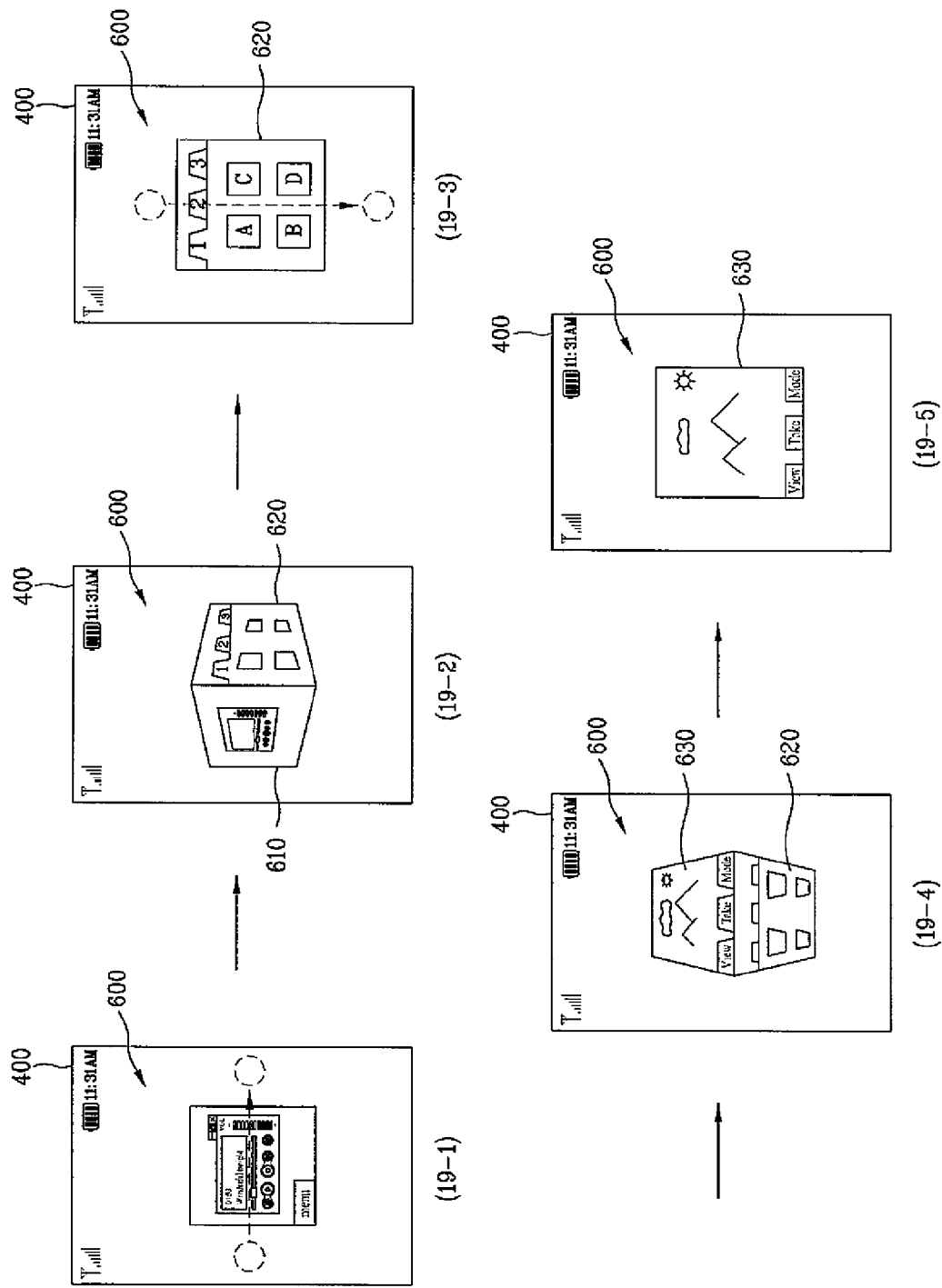
FIG. 19 and FIG. 20 are state diagrams of a display screen on which a method of controlling a mobile terminal according to a seventh embodiment of the present invention is implemented.
Figure 20:
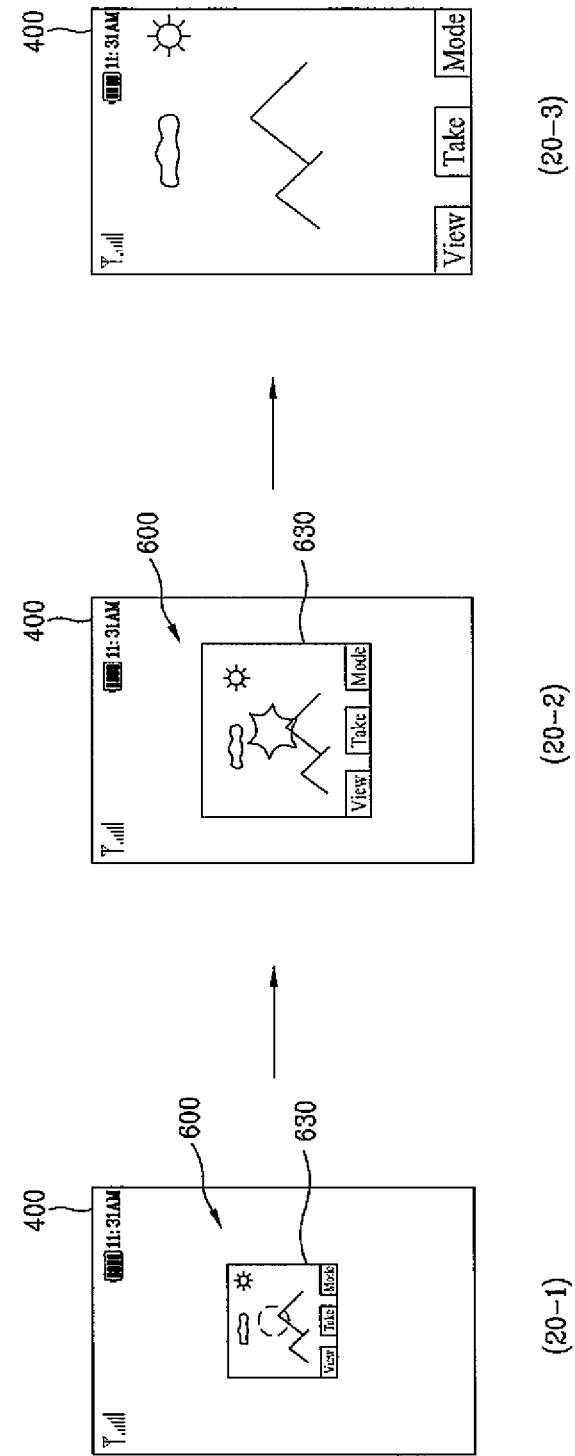

FIG. 18 is a flowchart of a method of controlling a mobile terminal according to a seventh embodiment of the present invention, and FIG. 19 and FIG. 20 are state diagrams of a display screen on which a method of controlling a mobile terminal according to a seventh embodiment of the present invention is implemented.

Referring to (19-1) of FIG. 19, an image according to a menu mode entry is displayed on the touchscreen 400. The menu mode entry in the mobile terminal 100 may be performed by an appropriate user's manipulation of the user input unit 130. This is apparent to those skilled in the art without further explanation and its details will be omitted in the description.

Referring to FIGS. 18 and 19, and in accordance with the present invention, a polyhedron 600 is displayed on the touchscreen 400 and a corresponding menu image is displayed on each facet of the polyhedron 600 [S181]. Preferably, the polyhedron is a hexahedron. This is explained in detail as follows.

Referring to (19-1) of FIG. 19, a first facet 610 of the polyhedron 600 may be displayed on a front of the polyhedron. An audio file play menu image may be exemplarily displayed on the first facet 610. A pointer may proximity-touch the touchscreen 400 and then be dragged in a first prescribed direction (e.g., right to left). If so, the polyhedron 600, as shown in (19-2) of FIG. 19, rotates at a prescribed angle (e.g., 90 degrees) in the first prescribed direction on the touchscreen 400 [S182].

Referring to (19-3) of FIG. 19, a second facet 620 of the polyhedron 600 may be displayed on a front of the polyhedron. And, an image viewing menu image may be exemplarily displayed on the second facet 620. Subsequently, the pointer may proximity-touch the touchscreen 400 and then be dragged in a second prescribed direction (e.g., up to down). If so, the polyhedron 600 rotates on the touchscreen 400 at a prescribed angle (e.g., 90 degrees) in the second prescribed direction [S182].

Referring to (19-5) of FIG. 19, a third facet 630 of the polyhedron 600 may be displayed on a front of the polyhedron. And, a photo capturing menu image may be exemplarily displayed on the third facet 630.

In accordance with the present invention, a process for selecting a specific menu (e.g., photo capturing menu) via the polyhedron 600 on the touchscreen 400 is explained with reference to FIG. 20 as follows. As mentioned in the foregoing description of FIG. 19, by rotating the polyhedron by performing the proximity touch and drag on the touchscreen, a specific menu image, such as the photo capturing menu image may be placed on a front of the polyhedron.

Hence, referring to (20-1) of FIG. 20, the third facet 630 of the polyhedron 600 may be displayed in front on the touchscreen 400 and the photo capturing menu image may be displayed on the third facet 630. Referring to FIG. 18 and (20-1) of FIG. 20, the pointer may proximity-touch the third facet 630 of the polyhedron 600 [S183].

Referring to (20-2) of FIG. 20, when proximity-touched, the third facet 630 of the polyhedron 600 is enlarged on the touchscreen 400 [S184]. Preferably, the magnification of the enlarged third facet 630 is proportional to an extent that the pointer approaches the third facet 630. If the proximity touch is released from the third facet 630, the third facet 630, as shown in (20-1) of FIG. 20, is displayed in its original size on the touchscreen 400.

Referring to FIG. 18 and (20-2) of FIG. 20, the pointer may contact-touch the third facet 630 of the polyhedron 600 on the touchscreen 400 [S185]. Referring to (20-3) of FIG. 20, when contact-touched, the third facet 630 of the polyhedron 600 is selected and displayed as a sufficiently large image on the touchscreen 400 [S186]. Hence, the photo capturing menu image according to the third facet 630 is displayed on the touchscreen 400.

Preferably, even if the contact touch is released, the photo capturing menu image is maintained as is. Therefore, a terminal user is able to perform a photographing function by viewing the photo capturing menu image.

A method of controlling a mobile terminal according to an eighth embodiment of the present invention is explained with reference to FIGS. 21 to 23 as follows.

Figure 21:
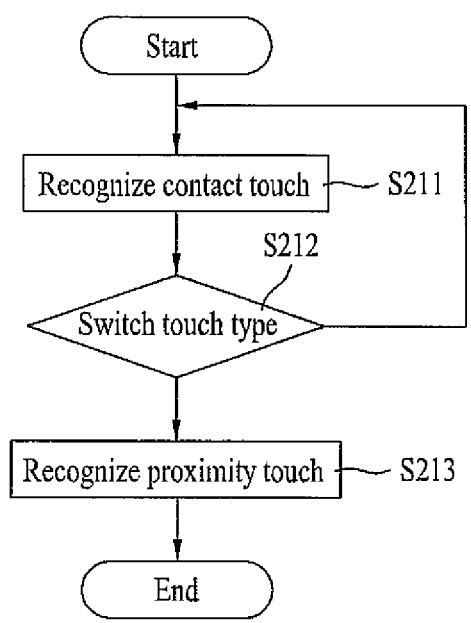
FIG. 21 is a flowchart of a method of controlling a mobile terminal according to an eighth embodiment of the present invention.
Figure 22:
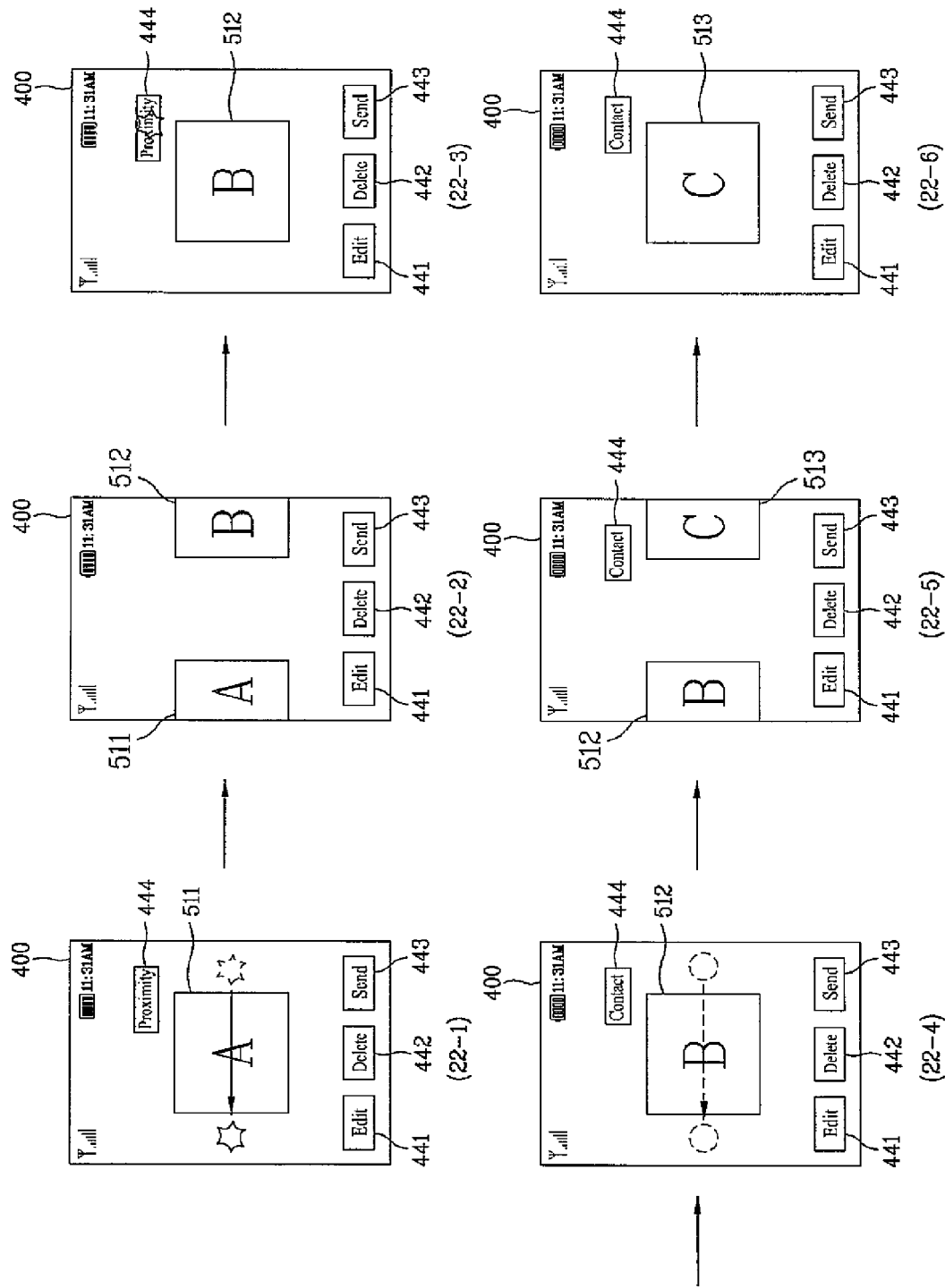
FIG. 22 and FIG. 23 are state diagrams of a display screen on which a method of controlling a mobile terminal according to an eighth embodiment of the present invention is implemented.
Figure 23:
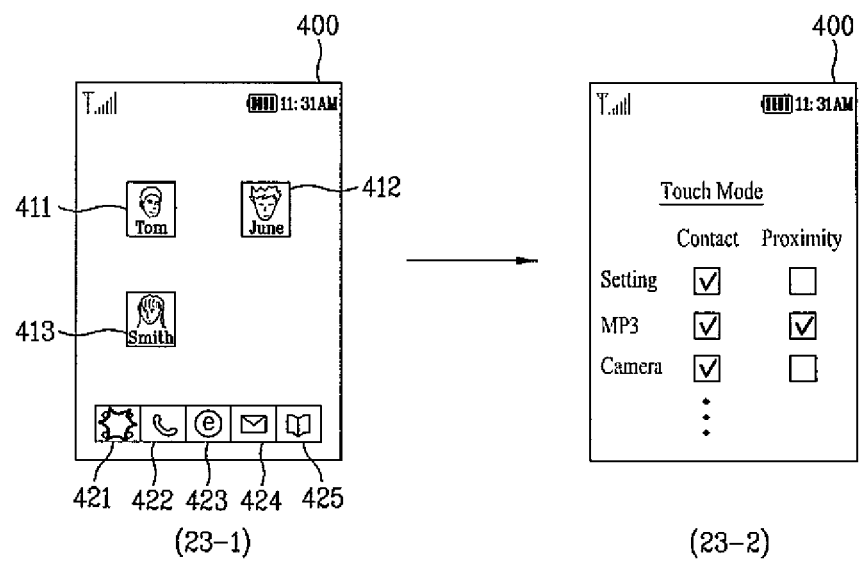

FIG. 21 is a flowchart of a method of controlling a mobile terminal according to an eighth embodiment of the present invention, and FIG. 22 and FIG. 23 are state diagrams of a display screen on which a method of controlling a mobile terminal according to an eighth embodiment of the present invention is implemented.

Referring to (22-1) of FIG. 22, an image viewing menu is executed in the mobile terminal 100 and an image viewing menu relevant image is displayed on the touchscreen 400. Moreover, a first image 511 is displayed on the touchscreen 400. Furthermore, a touch mode switching icon 444 is displayed on the touchscreen 100. Details of the touch mode switching icon will be explained.

Referring to FIG. 21 and (22-1) of FIG. 22, the touchscreen 400 is currently set to a contact touch mode. Accordingly, the touchscreen 400 recognizes a contact touch but is unable to recognize a proximity touch [S211]. In order to switch an image displayed on the touchscreen 400 to another image for example, the pointer, as shown in (22-1) of FIG. 22, preferably contact-touches the touchscreen 400 and is then dragged in a prescribed direction. Thus, the proximity touch and drag function of the pointer is unavailable.

Referring to (22-2) and (22-3) of FIG. 22, if the pointer is contact-touches and is then dragged, a second image 512 appears by sliding into the touchscreen 400 while the first image 511 disappears by sliding out of the touchscreen 400.

Referring to FIG. 21 and (22-3) of FIG. 22, the touch mode switching icon 444 may be selected [S212]. If so, the touchscreen 400 enters a proximity touch mode, such that a proximity touch is recognized but not a contact touch [S213].

In order to switch an image displayed on the touchscreen 400 to another image for example, the pointer, as shown in (22-4) of FIG. 22, preferably proximity-touches the touchscreen 400 and is then dragged in a prescribed direction. Thus, the contact touch and drag function of the pointer is unavailable.

Referring to (22-5) and (22-6) of FIG. 22, if the pointer is proximity-touched and dragged, a third image 513 appears by sliding into the touchscreen 400 while the second image 512 disappears by sliding out of the touchscreen 400.

For touch mode switching, it is not mandatory for a separate icon be provided on the touchscreen. For instance, touch mode switching can also be achieved by enabling a touch mode switching command to be inputted via a side key of the user input unit 130. Moreover, touch mode switching can be configured to automatically switch from the touch mode to the proximity touch mode, and vice versa, when the mobile terminal is coupled to an external cradle.

In the above description, mutual switching between the contact touch mode and the proximity touch mode in selecting the touch mode switching icon is explained, by which various embodiments of the present invention are not restricted. In selecting the touch mode switching icon, the present invention can be configured to enable sequential switching between the contact touch mode, the proximity touch mode, and a contact and proximity touch mode. In case that the contact and proximity touch mode is selected, both the contact touch and proximity touch are recognized on the touchscreen.

In the above description, explained is that the touch mode of the touchscreen 400 is collectively set and switched for all the menus of the mobile terminal 100, by which various embodiments of the present invention are not restricted. The present invention can be configured to enable a touch mode of the touchscreen to be set for each menu of the mobile terminal 100. This is explained in detail with reference to FIG. 23 as follows.

Referring to (23-1) of FIG. 23, the mobile terminal 100 enters a menu mode.

Referring to (23-2) of FIG. 23, a touch mode setting mode of the touchscreen is entered through an appropriate manipulation of the user input unit. The entry to the touch mode setting mode is apparent to those skilled in the art without separate explanation, of which details will be omitted in the description.

Referring to (23-2) of FIG. 23, the touch mode of the touch screen 400 can be set in advance for each menu of the mobile terminal 400. In particular, a setting may be made for which one of the proximity touch mode and the contact touch mode will be adopted for each menu. Both of the two modes may be adopted for a prescribed menu if necessary.

A method of controlling a mobile terminal according to a ninth embodiment of the present invention is explained with reference to FIG. 24 and FIG. 25 as follows.

Figure 24:
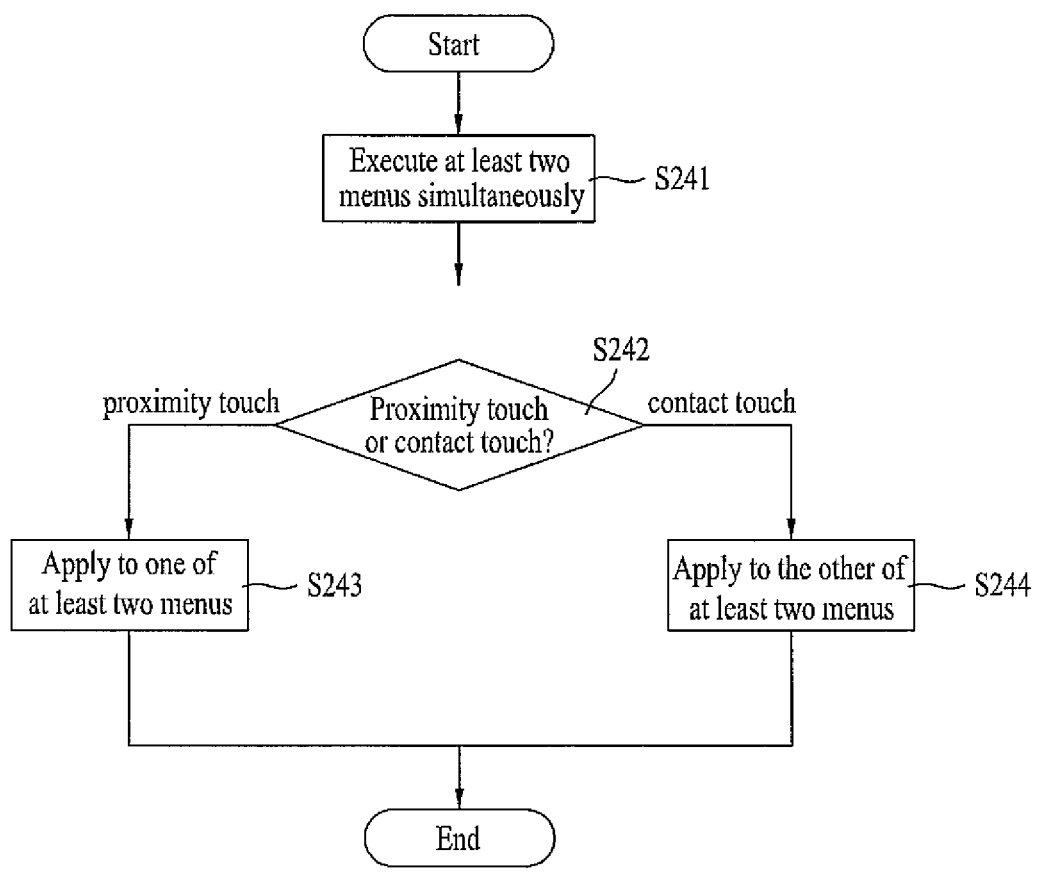
FIG. 24 is a flowchart of a method of controlling a mobile terminal according to a ninth embodiment of the present invention.
Figure 25:
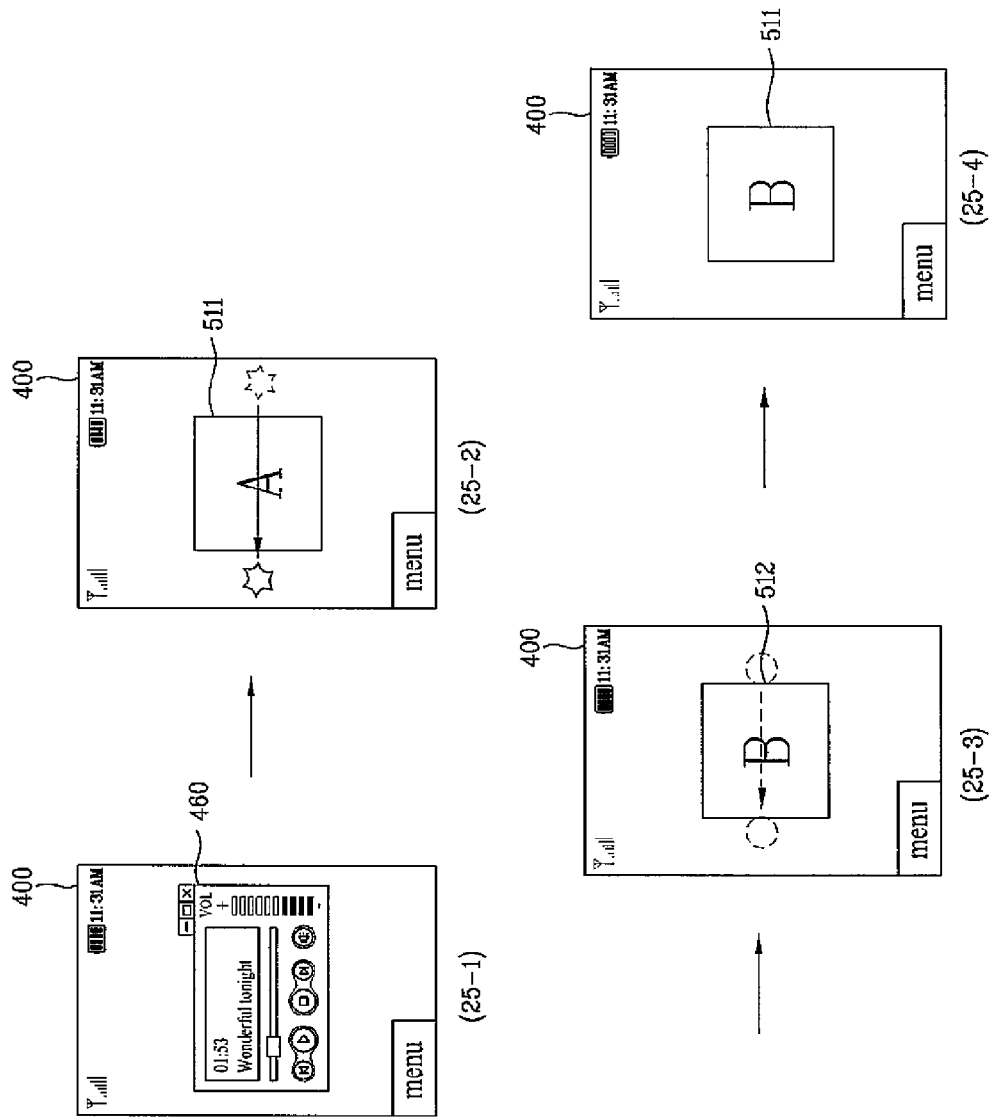
FIG. 25 is a state diagram of a display screen on which a method of controlling a mobile terminal according to a ninth embodiment of the present invention is implemented.

FIG. 24 is a flowchart of a method of controlling a mobile terminal according to a ninth embodiment of the present invention, and FIG. 25 is a state diagram of a display screen on which a method of controlling a mobile terminal according to a ninth embodiment of the present invention is implemented.

In the present embodiment, in case that at least two menus are simultaneously executed in the mobile terminal 100 by multitasking, proximity touch and contact touch are used discriminately from each other. In the following description of the present embodiment, both an audio file play menu and an image viewing menu are simultaneously executed, for example. The two menus are merely exemplary and other menus may be implemented in accordance with the embodiment.

Referring to FIG. 24 and (25-1) of FIG. 25, an audio file play menu is executed in the mobile terminal 100 and an image relevant to the audio file play menu is displayed on the touchscreen 400. While the audio file play menu is executed, an image viewing menu is executed in the mobile terminal 100 [S241]. Accordingly, in the touchscreen 400, as shown in (25-2) of FIG. 25, an image relevant to the image viewing menu is displayed. In particular, the audio file play menu relevant image is blocked by the image relevant to the newly executed image viewing menu.

In order to manipulate the image viewing menu, a contact touch is performed on the touch screen 400 [S242, S244]. For instance, in order to view a previous or next image on the image viewing menu, the pointer contact-touches the touchscreen 400 and is then dragged in a prescribed direction. Consequently, the image 511 displayed on the touchscreen 400, as shown in (25-2) and (25-3) of FIG. 25, is switched to another image 512.

Meanwhile, in order to manipulate the audio file play menu, a proximity touch is performed on the touchscreen 400 [S242, S243]. For instance, in order to adjust a volume in the audio file play menu or play a previous or next audio file, the pointer is proximity-touches the touchscreen 400 and is then dragged in a prescribed direction. If so, the volume of the audio file play menu is adjusted or the previous or next audio file is played while the image relevant to the image viewing menu displayed on the touchscreen, as shown in (25-4) of FIG. 25, is maintained.

In the above description, explained is the case that the proximity touch is performed to manipulate the audio file play menu and the case that the contact touch is performed to manipulate the image viewing menu, which does not restrict the various embodiments of the present invention. Alternatively, the present embodiment can be configured such that the contact touch is performed to manipulate the audio file play menu, or the proximity touch is performed to manipulate the image viewing menu.

A method of controlling a mobile terminal according to a tenth embodiment of the present invention is explained with reference to FIG. 26 and FIG. 27 as follows.

Figure 26:
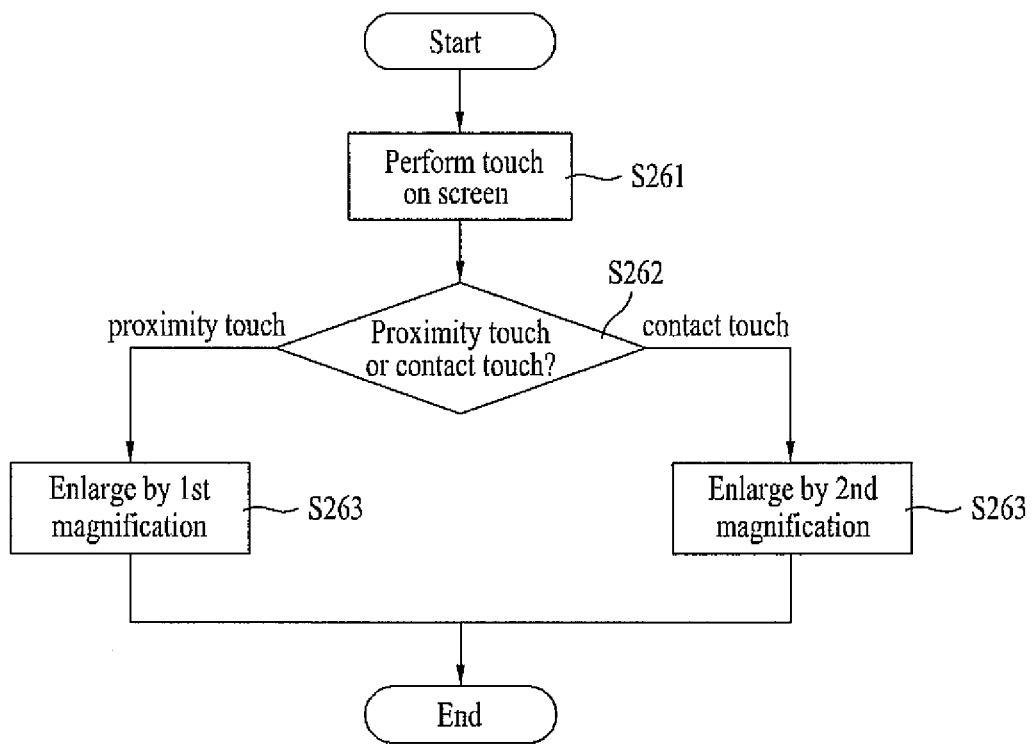
FIG. 26 is a flowchart of a method of controlling a mobile terminal according to a tenth embodiment of the present invention.
Figure 27:
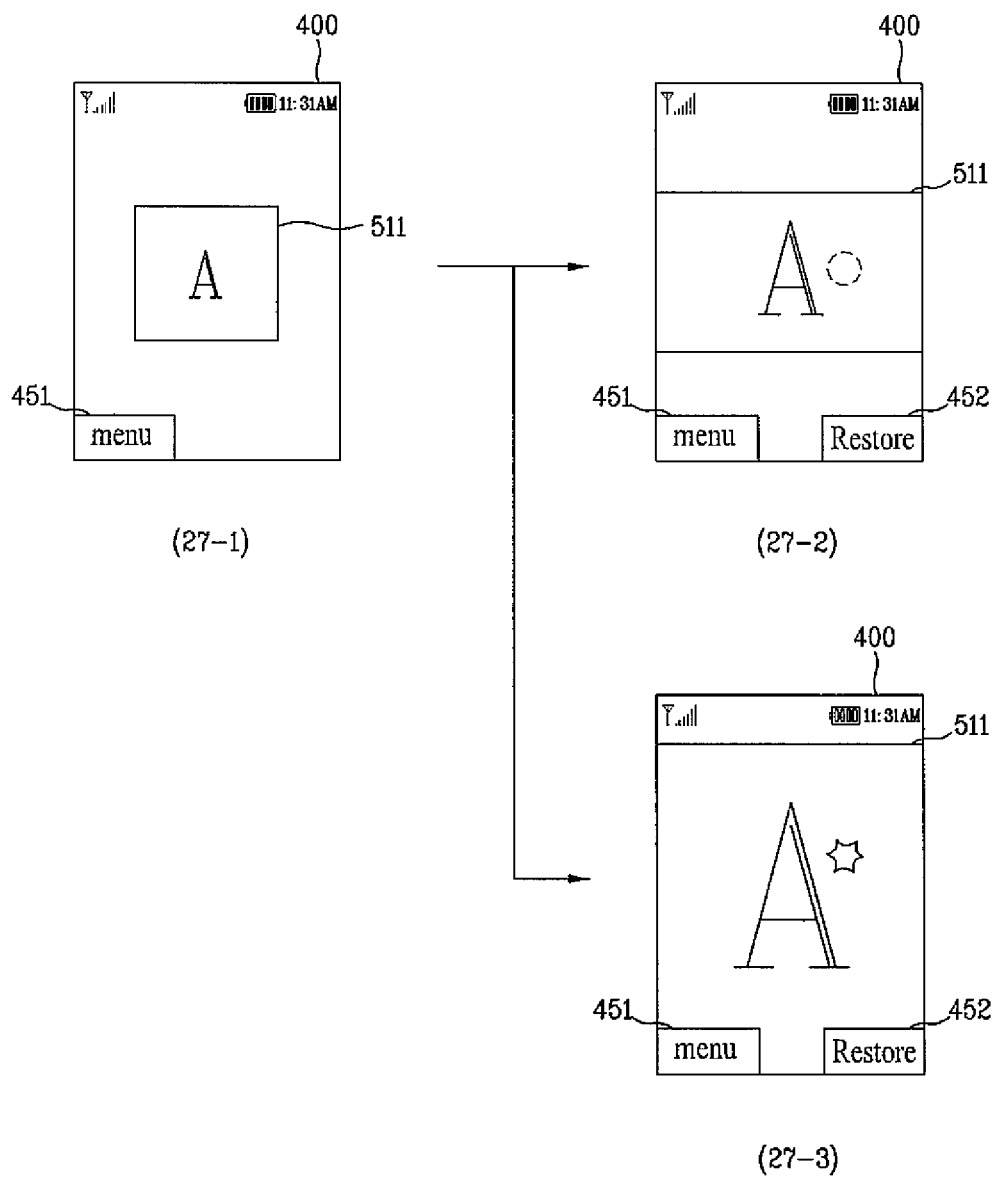
FIG. 27 is a state diagram of a display screen on which a method of controlling a mobile terminal according to a tenth embodiment of the present invention is implemented.

FIG. 26 is a flowchart of a method of controlling a mobile terminal according to a tenth embodiment of the present invention, and FIG. 27 is a state diagram of a display screen on which a method of controlling a mobile terminal according to a tenth embodiment of the present invention is implemented.

In the present embodiment, when a prescribed menu is executed in the mobile terminal 100, a proximity touch and a contact touch are usable for a specific manipulation of the prescribed menu. And, the present embodiment can be configured in a manner that a scale or extent of the specific manipulation is differentiated according to whether the touch corresponds to the proximity touch or the contact touch. The following description is based on the assumption that an image viewing menu is executed in the mobile terminal.

First, an image viewing menu is executed in the mobile terminal 100. Accordingly, an image relevant to the image viewing menu, as shown in (27-1) of FIG. 27, is displayed on the touchscreen 400.

Referring to FIGS. 26 and 27, a proximity touch may be performed on an image 511 displayed on the touchscreen 400 [S261]. Referring to (27-2) of FIG. 27, the image 511 is enlarged by a first magnification (e.g., ×1, ×2, ×3, . . . ) each time the proximity touch is performed (or in proportion to a time the proximity touch is maintained) [S262, S263]. If a restore icon 452 is selected from the touchscreen 400, the image 511 is displayed by being restored to an original size.

Meanwhile, a contact touch may be performed on the image 511, as shown in (27-1) of FIG. 27, displayed on the touchscreen 400 [S261]. Referring to (27-3) of FIG. 27, the image 511 is enlarged by a second magnification (e.g., ×2, ×4, ×6, . . . ) each time the contact touch is performed (or in proportion to a time the contact touch is maintained) [S264]. If the restore icon 452 is selected from the touchscreen 400, the image 511 is displayed by being restored to an original size.

In the above description, explained is a case that a magnification of enlarging an image differs according to a touch type, wherein various embodiments of the present invention are not restricted. For instance, a scale of volume adjustment in an audio play menu may differ according to a touch type. Moreover, a fine adjustment of volume may be achieved by a proximity touch and drag and a coarse adjustment of volume may be achieved by a contact touch and drag, and vice versa. Furthermore, the present embodiment may be extended such that a fine adjustment of volume is achieved according to a first distance proximity touch and drag and a coarse adjustment of volume is achieved by a second distance proximity touch and drag.

A method of controlling a mobile terminal according to an eleventh embodiment of the present invention is explained with reference to FIG. 28 and FIG. 29 as follows.

Figure 28:
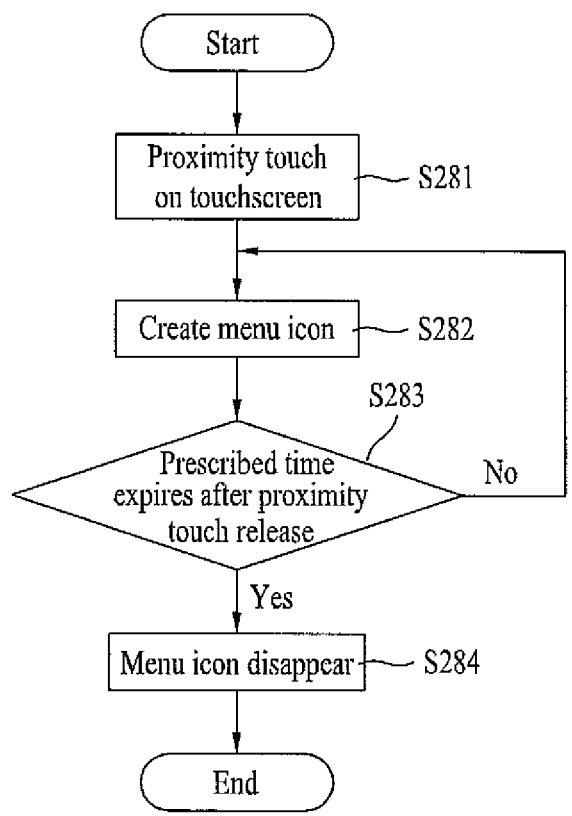
FIG. 28 is a flowchart of a method of controlling a mobile terminal according to an eleventh embodiment of the present invention.
Figure 29:
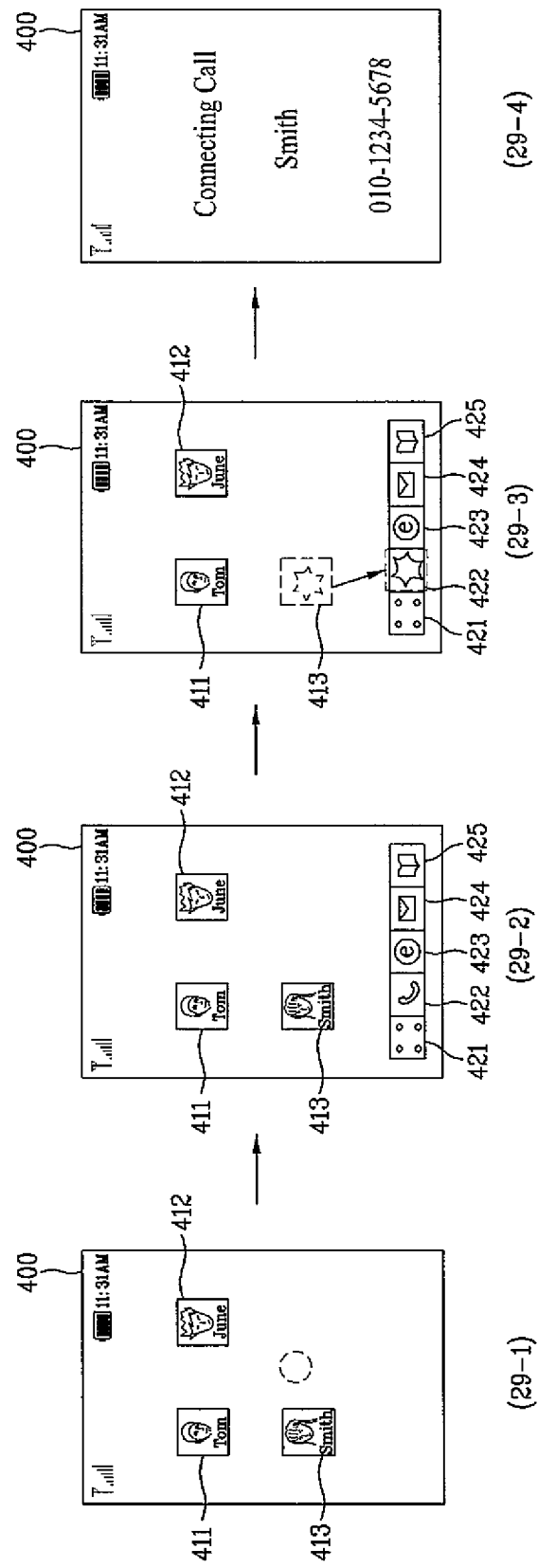
FIG. 29 is a state diagram of a display screen on which a method of controlling a mobile terminal according to an eleventh embodiment of the present invention is implemented.

FIG. 28 is a flowchart of a method of controlling a mobile terminal according to an eleventh embodiment of the present invention, and FIG. 29 is a state diagram of a display screen on which a method of controlling a mobile terminal according to an eleventh embodiment of the present invention is implemented.

Referring to (29-1) of FIG. 29, a standby image is exemplarily displayed on the touchscreen 400. And, correspondent phone number icons 411, 412 and 413 are exemplarily displayed on the standby image.

Referring to FIGS. 28 and 29, a pointer, as shown in (29-1) of FIG. 29, may proximity-touch a prescribed position of the touchscreen 400 [S281]. Referring to (29-2) of FIG. 29, when the touchscreen 400 is proximity-touched, menu icons 421, 422, 423, 424 and 425 are created and displayed on the touchscreen 400 [S282]. For example, the menu icons 421, 422, 423, 424 and 425 may appear by sliding from a lower end of the touchscreen 400.

In accordance with the present invention, the proximity touch may be released from the touchscreen 400 [S283]. In particular, when the proximity touch is released, the menu icons 421, 422, 423, 424 and 425 disappear.

Alternatively, even if the proximity touch is released, the menu icons 421, 422, 423, 424 and 425 may be maintained on the touchscreen 400 for a prescribed time. Preferably, the menu icons 421, 422, 423, 424 and 425 may disappear from the touchscreen 400 after a prescribed time has elapsed from the time of release of the proximity touch [S284].

While the menu icons 421, 422, 423, 424 and 425 continue to appear on the touchscreen 400, the pointer may contact-touch a specific correspondent phone number icon 413 among the correspondent phone number icons 411, 412 and 413, for example, as shown in (29-3) of FIG. 29, and drag the icon 413 to a specific menu icon 422 among the menu icons 421, 422, 423, 424 and 425, for example. If so, referring to (29-4) of FIG. 29, a function assigned to the selected menu icon 422 is executed for the dragged correspondent phone number icon 413.

In accordance with the present invention, when the menu icons 421, 422, 423, 424 and 425 are displayed, the corresponding function need not be executed only if the correspondent phone number icon is dragged. Instead, the corresponding function may be executed if one of the menu icons 421, 422, 423, 424 and 425 is directly contact-touched.

In the above description, if the proximity touch is performed on the touchscreen while the phone number icons remain on the touchscreen prior to the proximity touch, the menu icons are created. This does not put limitation on various embodiments of the present invention. For instance, while phone number icons are not displayed on the touchscreen, if the proximity touch is performed on the touchscreen, the phone number icons and the menu icons can be configured to be simultaneously or sequentially displayed. This is apparent to those skilled in the art without further explanation and its details will be omitted in the description.

A method of controlling a mobile terminal according to a twelfth embodiment of the present invention is explained with reference to FIG. 30 and FIG. 31 as follows.

Figure 30:
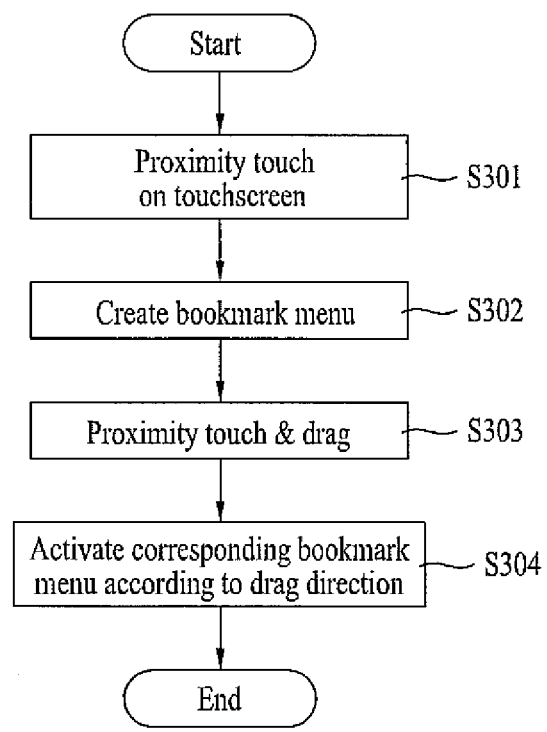
FIG. 30 is a flowchart of a method of controlling a mobile terminal according to a twelfth embodiment of the present invention.
Figure 31:
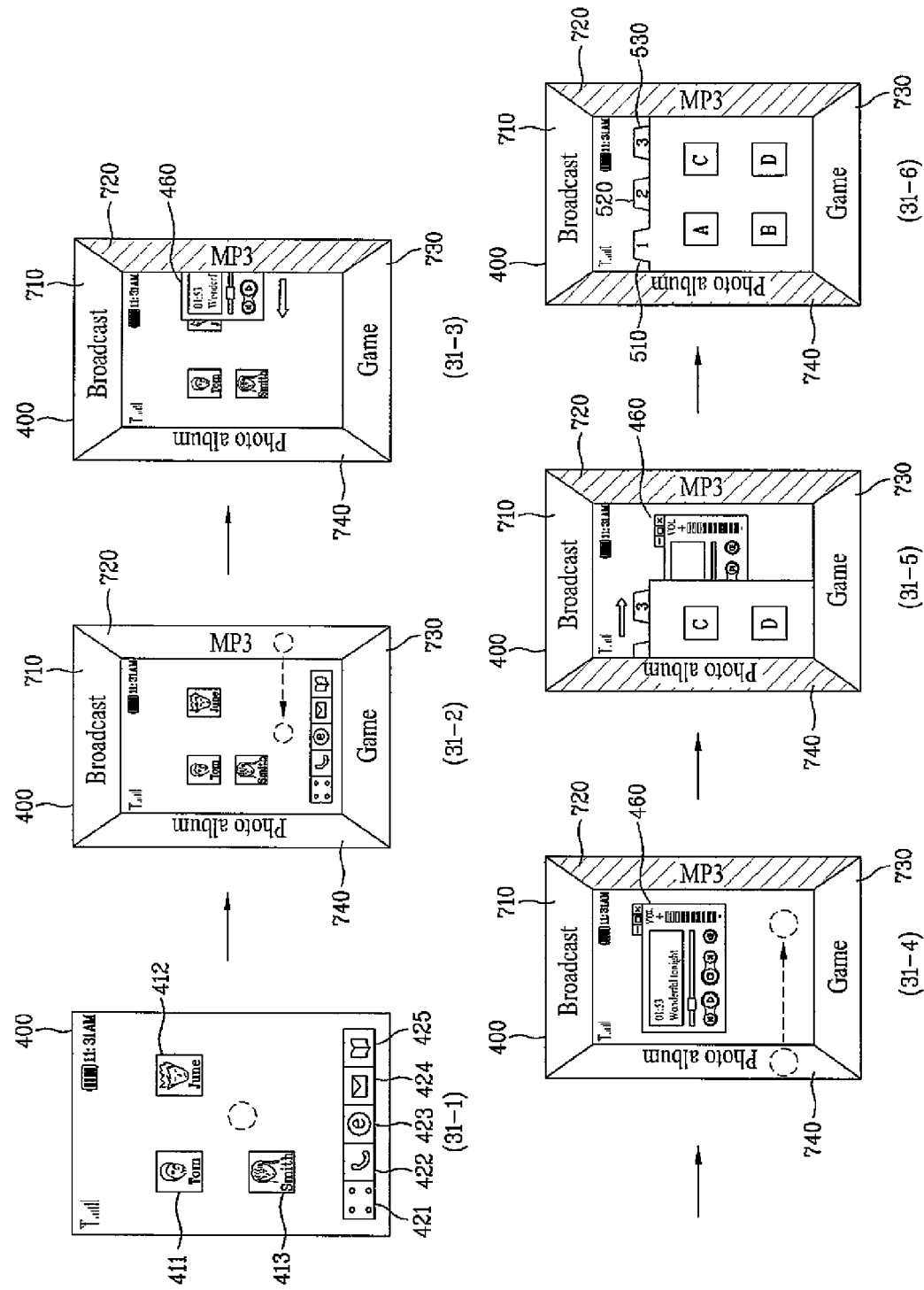
FIG. 31 is a state diagram of a display screen on which a method of controlling a mobile terminal according to a twelfth embodiment of the present invention is implemented.

FIG. 30 is a flowchart of a method of controlling a mobile terminal according to a twelfth embodiment of the present invention, and FIG. 31 is a state diagram of a display screen on which a method of controlling a mobile terminal according to a twelfth embodiment of the present invention is implemented.

Referring to FIG. 30 and (31-1) of FIG. 31, a standby image is displayed on the touchscreen 400. Accordingly, a pointer may proximity-touch the touchscreen 400 [S301].

As soon as the proximity touch is performed or after elapse of a prescribed time after the proximity touch, the standby image is displayed by being reduced into the touchscreen 400 by a prescribed magnification and new menu icons are displayed on sides of the touchscreen 400, as shown in (31-2) of FIG. 31 [S302]. The new menu icons may include bookmark menu icons. Notably, the new menu icons do not necessarily have to be on the sides of the touchscreen. Rather, the new menu icons can be placed at other positions of the touchscreen 400. Moreover, it is not mandatory for the standby image to be reduced. Instead, the bookmark menu icons can be created while the standby image is maintained.

In (31-2) of FIG. 31, exemplarily shown are four bookmark menu icons, i.e., a broadcast menu icon 710, an audio file play menu icon 720, a game menu icon 730 and an image viewing menu icon 740. This does not put limitation on various embodiments of the present invention. For instance, the present embodiment may configure more or less bookmark menu icons, or other menu icons other than the exemplarily shown bookmark menu icons can be displayed.

Referring to (31-2) of FIG. 31, the pointer may proximity-touch the touchscreen 400 and then be dragged right to left [S303]. In this case, the present embodiment may be configured such that a start point of the proximity touch and drag is the audio file play menu icon 720.

Referring to (31-3) of FIG. 31, the audio file play menu begins as soon as an audio file play menu relevant image 460 is displayed by sliding out of a right side of the touchscreen 400 [S304]. If so, a terminal user is able to play a specific audio file through the audio file play menu relevant image 460.

If the audio file play menu relevant image 460 is proximity-touched with the pointer and then dragged left to right, the audio file play menu can be terminated as the audio file play menu relevant image 460 disappears by sliding out to the right side.

However, referring to (31-4) of FIG. 31, while the audio file play menu is activated, the image viewing menu icon 740 may be proximity-touched on the touchscreen 400 with the pointer and then dragged left to right [S303]. If so, referring to (31-5) of FIG. 31, while the audio file play menu is activated, the image viewing menu begins as soon as the image viewing menu relevant images 510, 520 and 530 are displayed by sliding out of the left side of the touchscreen 400 [S304]. Therefore, a terminal user is able to view a specific image through the image viewing menu relevant image while the audio file play menu is activated.

In the above description, while the audio file play menu is activated, when the image viewing menu relevant image slides are displayed, the audio file play menu remains intact. Alternatively, the present embodiment can be configured in a manner that the audio file play menu relevant image disappears by sliding to the right side when the image viewing menu relevant image is displayed by sliding from the left side [not shown in the drawing]. Alternatively, the present embodiment can be configured in a manner that the audio file play menu operation is maintained or terminated when the audio file play menu relevant image disappears by sliding into the right side.

A method of controlling a mobile terminal according to a thirteenth embodiment of the present invention is explained with reference to FIG. 32 and FIG. 33 as follows.

Figure 32:
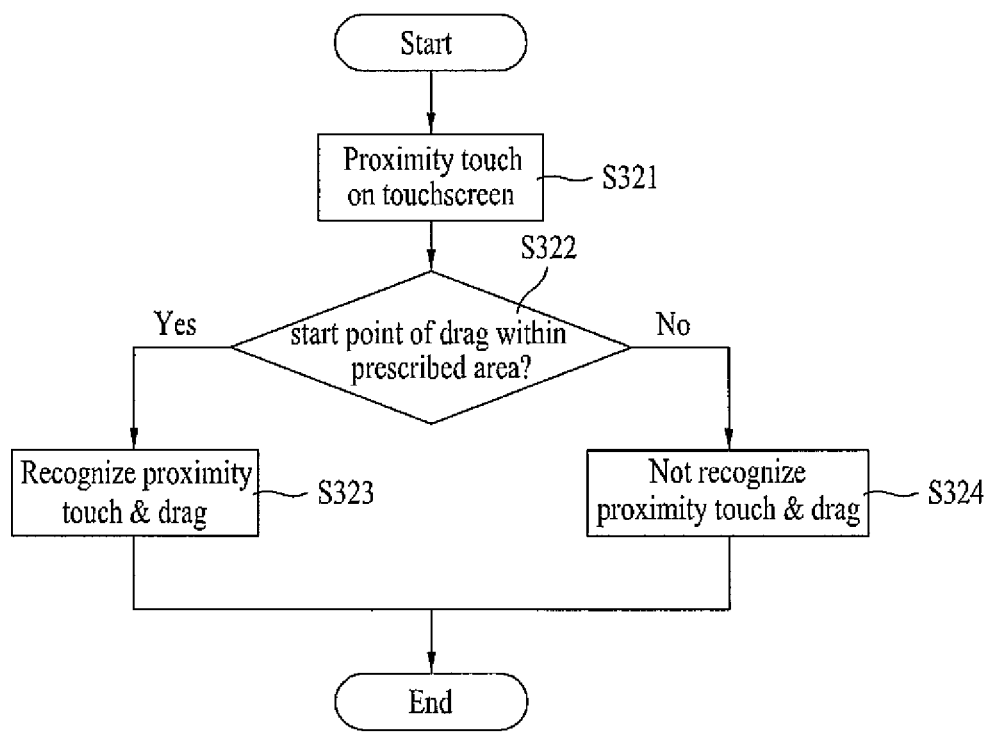
FIG. 32 is a flowchart of a method of controlling a mobile terminal according to a thirteenth embodiment of the present invention.
Figure 33:
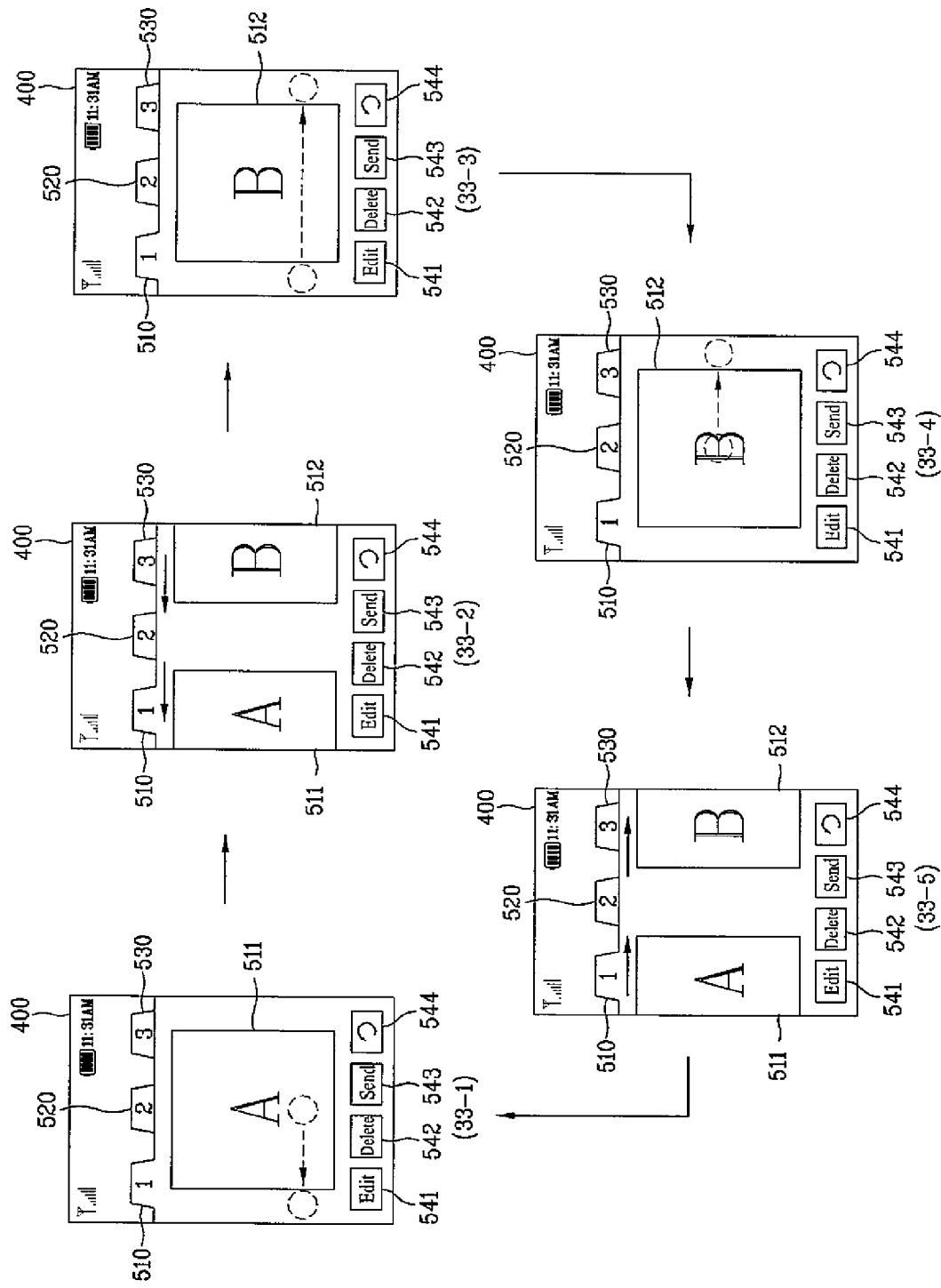
FIG. 33 is a state diagram of a display screen on which a method of controlling a mobile terminal according to a thirteenth embodiment of the present invention is implemented.

FIG. 32 is a flowchart of a method of controlling a mobile terminal according to a thirteenth embodiment of the present invention, and FIG. 33 is a state diagram of a display screen on which a method of controlling a mobile terminal according to a thirteenth embodiment of the present invention is implemented.

Referring to (33-1) of FIG. 33, an image viewing menu is activated in the mobile terminal 100, whereby an image viewing menu relevant image is displayed on the touchscreen 400. The present embodiment is applicable not only to the image viewing menu but also to other menus. Thus, it is understood that the image viewing menu is just an exemplarily selected menu.

In accordance with the present invention, a pointer may proximity-touch a prescribed area of the touchscreen 100 and then be dragged right to left [S321]. Preferably, a start point of the proximity touch and drag corresponds to the prescribed area. In (33-1) of FIG. 33, exemplarily shown is the prescribed area on which an image is displayed. Alternatively, the present embodiment can be configured in a manner that the prescribed area includes other areas.

Referring to FIG. 32 and (33-2) of FIG. 33, according to the proximity touch and drag, a second image 512 appears by sliding from the right side when a first image 511 displayed on the touchscreen disappears by sliding to the left side [S322, S323]. Subsequently, referring to (33-3) of FIG. 33, after the proximity touch and drag is performed, a terminal user may unintentionally shift the pointer to approach and cross left to right over the touchscreen 400 [S321].

However, in accordance with the present invention, the proximate shift of the pointer, as shown in (33-4) of FIG. 33, may not be recognized by the touchscreen 400. This is because the proximate shift of the pointer may not start from the prescribed area [S322, S324].

Meanwhile, referring to (33-4) of FIG. 33, the pointer may proximity-touch the second image 512 and then be dragged left to right [S321]. If so, referring to (33-5) of FIG. 33, according to the proximity touch and drag, the first image 511 appears by sliding out of the left side while the displayed second image 512 disappears by sliding to the right side [S322, S323].

A method of controlling a mobile terminal according to a fourteenth embodiment of the present invention is explained with reference to FIG. 34 and FIG. 35 as follows.

Figure 34:
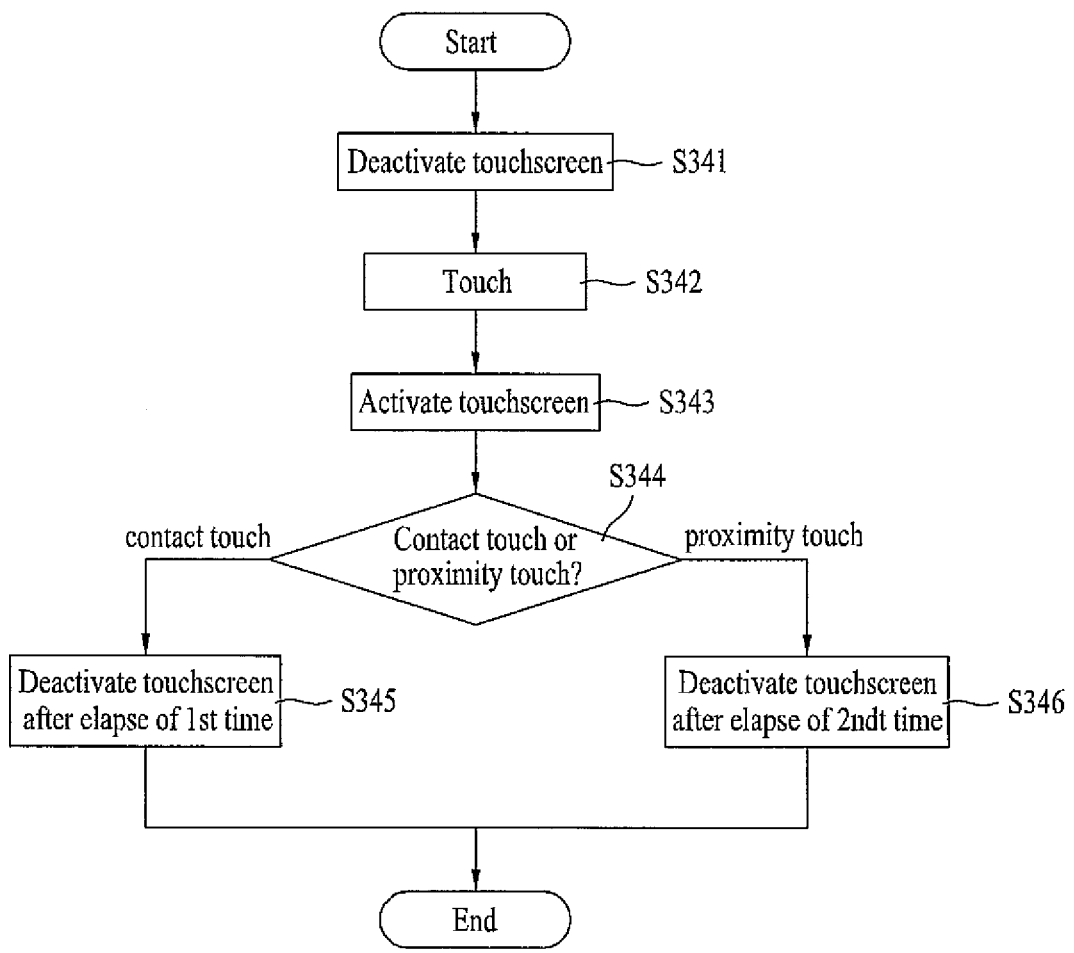
FIG. 34 is a flowchart of a method of controlling a mobile terminal according to a fourteenth embodiment of the present invention.

FIG. 34 is a flowchart of a method of controlling a mobile terminal according to a fourteenth embodiment of the present invention, and FIG. 35 is a state diagram of a display screen on which a method of controlling a mobile terminal according to a fourteenth embodiment of the present invention is implemented.

Referring to FIG. 34 and (35-1) of FIG. 35, the touchscreen 400 is deactivated [S341]. If there is no touch input for a predetermined time, the touchscreen 400 may be automatically deactivated to prevent battery power consumption.

Afterward, the touchscreen 400 is touched with the pointer [S342]. If so, the touchscreen 400, as shown in (35-2) of FIG. 35, is activated [S343]. Accordingly, a standby image may be exemplarily displayed on the activated touchscreen 400.

Subsequently, the controller 180 decides whether the touch corresponds to a contact touch or a proximity touch [S344]. Referring to (35-2) of FIG. 35, if the touch corresponds to the contact touch, the controller 180 deactivates the touchscreen 400 if an additional touch, a manipulation of the user input unit 130, an event occurrence or the like is not made for a first prescribed time after a timing point of the touch [S345].

Referring to (35-2) of FIG. 35, if the touch corresponds to the proximity touch, the controller 180 deactivates the touchscreen 400 if an additional touch, a manipulation of the user input unit 130, an event occurrence or the like is not made for a second prescribed time after a timing point of the touch [S346]. Preferably, the second prescribed time may be set to be shorter or longer than the first prescribed time.

In the above description, the present embodiment is configured in a manner that the activated time of the touchscreen varies according to the touch type, i.e., the contact touch or the proximity touch. Alternatively, the present embodiment can be configured in a manner that the activated time of the touchscreen varies according to a touched area of the touchscreen. This is apparent to those skilled in the art without further explanation and its details will be omitted in the description for clarity of this disclosure.

Accordingly, the present invention provides the following effects and/or advantages. First, according to embodiments of the present invention, a proximity touch and a contact touch can be performed by being discriminated from each other. Even if various menus exist within a terminal, a terminal user is facilitated to select a specific menu. Second, the terminal user is also facilitated to input a specific command to the selected menu.

It will be apparent to those skilled in the art that the present invention can be specified into other forms without departing from the spirit or scope of the inventions.

For instance, in the foregoing description of the embodiments of the present invention, a proximity touch and a contact touch are discriminated from each other and then recognized as different commands on a touchscreen. This does not put limitation on various embodiments of the present invention. In particular, the proximity touch can be divided into a first distance proximity touch and a second distance proximity touch according to a proximate distance from the touchscreen. Hence, the aforesaid embodiments for discriminating the proximity touch and the contact touch from each other are applicable to the first and second distance proximity touches as they are.

In addition, for instance, the above-described methods can be implemented in a programmable recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a mobile terminal having a touchscreen, the method comprising:
   executing an audio application;
   displaying the audio application having a first menu on the touchscreen, wherein the first menu comprises a volume control item for adjusting volume of audio output of the audio application and a file play item for changing a currently executing audio file to either a previous file or a next audio file;
   terminating the displaying of the audio application and the first menu so that the audio application and the first menu are no longer displayed, continuing the executing of the audio application, and displaying on the touchscreen content of an image application, all in response to an input;
   simultaneously performing the executing of the audio application and executing of the image application while the audio application and the first menu are not displayed;

changing the displayed content of the image application in response to a contact input received at the touchscreen while the image application is executing and while none of the audio application and the first menu are displayed, wherein any proximity touch input received at the touchscreen while the content of the image application is displayed does not manipulate the image application;

adjusting volume of the audio output of the audio application when a first proximity touch input is received at the touchscreen at a first defined direction while the image application is executing, while the content of the image application is displayed, and while none of the audio application and the first menu are displayed; and changing the currently executing audio file of the audio application to either a previous file or a next audio file when a second proximity touch input is received at the touchscreen at a second defined direction while the image application is executing, while the content of the image application is displayed, and while none of the audio application and the first menu are displayed, wherein the first proximity touch input and the second proximity touch input are inputs that do not contact a surface of the touchscreen, and wherein the contact input is received in a direction that is the same as a direction that the first proximity touch input and the second proximity touch input are received.

2. The method of claim 1, wherein:
the contact input comprises a touch-and-drag input; and
the first proximity touch input and the second proximity touch input each comprises a proximity touch-and-drag input.

3. A method for controlling a mobile terminal having a touchscreen, the method comprising:
executing an audio application;
displaying the audio application having a first menu on the touchscreen, wherein the first menu comprises a volume control item for adjusting volume of audio output of the audio application and a file play item for changing a currently executing audio file to either a previous file or a next audio file;
terminating the displaying of the audio application and the first menu so that the audio application and the first menu are no longer displayed, continuing the executing of the audio application, and displaying on the touchscreen content of an image application, all in response to an input;
simultaneously performing the executing of the audio application and executing of the image application while the audio application and the first menu are not displayed;
changing the displayed content of the image application in response to a first input of a first input type received at the touchscreen while the image application is executing and while none of the audio application and the first menu are displayed;
adjusting volume of the audio output of the audio application when a second input of a second input type is received at the touchscreen at a first defined direction while the image application is executing, while the content of the image application is displayed, and while none of the audio application and the first menu are displayed; and
changing the currently executing audio file of the audio application to either a previous file or a next audio file when a third input of the second input type is received at the touchscreen at a second defined direction while the image application is executing, while the content of the image application is displayed, and while none of the audio application and the first menu are displayed, wherein when the first input type is a proximity touch input the second input type is a contact input, and when the first input type is the contact input the second input type is the proximity touch input, and wherein the proximity touch input does not contact a surface of the touchscreen.

4. The method of claim 3, wherein:
the contact input comprises a touch-and-drag input; and
the proximity touch input comprises a proximity touch-and-drag input.

5. A mobile terminal, comprising:
a touchscreen; and
a control unit operatively coupled to the touchscreen and being configured to:
execute an audio application;
cause the touchscreen to display the audio application having a first menu, wherein the first menu comprises a volume control item for adjusting volume of audio output of the audio application and a file play item for changing a currently executing audio file to either a previous file or a next audio file;
terminate the displaying of the audio application and the first menu so that the audio application and the first menu are no longer displayed, continue the executing of the audio application, and cause the touchscreen to display content of an image application, all in response to an input;
simultaneously perform the executing of the audio application and executing of the image application while the audio application and the first menu are not displayed;
change the displayed content of the image application in response to a contact input received at the touchscreen while the image application is executing and while none of the audio application and the first menu are displayed, wherein any proximity touch input received at the touchscreen while the content of the image application is displayed does not manipulate the image application;
adjust volume of the audio output of the audio application when a first proximity touch input is received at the touchscreen at a first defined direction while the image application is executing, while the content of the image application is displayed, and while none of the audio application and the first menu are displayed; and
change the currently executing audio file of the audio application to either a previous file or a next audio file when a second proximity touch input is received at the touchscreen at a second defined direction while the image application is executing, while the content of the image application is displayed, and while none of the audio application and the first menu are displayed, wherein the first proximity touch input and the second proximity touch input are inputs that do not contact a surface of the touchscreen, and wherein the contact input is received in a direction that is the same as a direction that the first proximity touch input and the second proximity touch input are received.

6. The mobile terminal of claim 5, wherein:
the contact input comprises a touch-and-drag input; and
the first proximity touch input and the second proximity touch input each comprises a proximity touch-and-drag input.

* * * * *